US012410009B2

(12) United States Patent
Mohanarajah et al.

(10) Patent No.: US 12,410,009 B2
(45) Date of Patent: Sep. 9, 2025

(54) AUTOMATED STORAGE AND RETRIEVAL SYSTEM

(71) Applicant: Rapyuta Robotics Co., Ltd., Tokyo (JP)

(72) Inventors: Gajamohan Mohanarajah, Tokyo (JP); Arudchelvan Krishnamoorthy, Tokyo (JP); Kousuke Yunoki, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 367 days.

(21) Appl. No.: 18/165,375

(22) Filed: Feb. 7, 2023

(65) Prior Publication Data

US 2023/0278794 A1 Sep. 7, 2023

Related U.S. Application Data

(60) Provisional application No. 63/315,563, filed on Mar. 2, 2022, provisional application No. 63/482,805, filed on Feb. 2, 2023.

(51) Int. Cl.
*B65G 1/04* (2006.01)
*B25J 9/16* (2006.01)
(Continued)

(52) U.S. Cl.
CPC ............ *B65G 1/0492* (2013.01); *B25J 9/161* (2013.01); *B25J 9/1676* (2013.01); *B25J 13/006* (2013.01);
(Continued)

(58) Field of Classification Search
CPC ...... B65G 1/0464; B65G 1/0492; B65G 1/10; B65G 1/0471; B65G 1/127; B65G 1/04;
(Continued)

(56) References Cited

U.S. PATENT DOCUMENTS 10,435,243 B2 * 10/2019 Schmidt .................. B66F 9/063
11,097,897 B1 * 8/2021 Theobald ............. B65G 1/1373
(Continued)

FOREIGN PATENT DOCUMENTS

JP 06-024506 A 2/1994
JP 2017-522247 A 8/2017
(Continued)

OTHER PUBLICATIONS

International Search Report and Written Opinion mailed on Apr. 4, 2023 in the PCT Application No. PCT/JP2023/006764.

*Primary Examiner* — Glenn F Myers
(74) *Attorney, Agent, or Firm* — Trupti P. Joshi

(57) ABSTRACT

There is provided an automated storage and retrieval system including: a rack storing a plurality of bins for containing items; a transportation robot transporting the bin in the rack; and a transportation elevator which moves in the rack and can transport the transportation robot. The rack includes a plurality of floors each of which stores each of the plurality of bins, and allows the transportation robot to run along a surface thereof, and the rack includes a plurality of support column modules forming a passage of the transportation elevator. Each of the support column modules extends between at least mutually neighboring floors, and one support column module is configured to be able to be coupled to the another support column module.

20 Claims, 33 Drawing Sheets

(51) Int. Cl.
  *B25J 13/00* (2006.01)
  *B65G 1/06* (2006.01)
  *B65G 1/10* (2006.01)
  *B65G 1/127* (2006.01)
  *B65G 1/137* (2006.01)
  *B25J 5/00* (2006.01)

(52) U.S. Cl.
  CPC ......... *B65G 1/0471* (2013.01); *B65G 1/0478* (2013.01); *B65G 1/06* (2013.01); *B65G 1/065* (2013.01); *B65G 1/10* (2013.01); *B65G 1/127* (2013.01); *B65G 1/1371* (2013.01); *B65G 1/1373* (2013.01); *B25J 5/007* (2013.01); *B65G 2201/0235* (2013.01); *B65G 2201/0258* (2013.01); *B65G 2203/0233* (2013.01); *B65G 2203/0283* (2013.01); *B65G 2811/0678* (2013.01)

(58) Field of Classification Search
  CPC ........... B65G 1/065; B65G 2201/0235; B65G 2201/0414; B65G 2201/0492; B65G 2203/0233; B65G 2203/0283; B65G 2811/0678
  See application file for complete search history.

(56) References Cited

U.S. PATENT DOCUMENTS

| | | | |
|---|---|---|---|
| 2016/0009493 A1 | 1/2016 | Stevens et al. | |
| 2017/0267452 A1 | 9/2017 | Goren et al. | |
| 2018/0079626 A1* | 3/2018 | Brady | B66B 9/00 |
| 2021/0221615 A1 | 7/2021 | Buchmann | |
| 2021/0347569 A1* | 11/2021 | Dayrell | B66B 9/003 |
| 2022/0024737 A1* | 1/2022 | Ai | B65G 1/1373 |
| 2022/0106122 A1 | 4/2022 | Tie | |
| 2022/0281683 A1* | 9/2022 | Huang | B65G 1/06 |

FOREIGN PATENT DOCUMENTS

| | | |
|---|---|---|
| JP | 2018-516824 A | 6/2018 |
| WO | WO 2021/122218 A1 | 6/2021 |
| WO | WO 2021/218931 A1 | 11/2021 |

* cited by examiner

AUTOMATED STORAGE AND RETRIEVAL SYSTEM

CROSS-REFERENCE TO RELATED APPLICATIONS

The present application claims the benefit of priority to U.S. Provisional Application No. 63/315,563 filed on Mar. 2, 2022, and U.S. Provisional Application No. 63,482/805 filed on Feb. 2, 2023, the contents of each of which are hereby incorporated by reference in their entirety

TECHNICAL FIELD

The present disclosure generally relates to a warehouse system such as an Automated Storage and Retrieval System (an ASRS or an AS/RS).

BACKGROUND

As Electronic Commerce (EC) markets expand, improvement of item storage efficiency and item picking work efficiency for logistics has become a great problem. In order to resolve this problem, for example, WO2018/189110 A1 discloses a warehouse. This warehouse is partitioned into a storage area 10 and an order preparation area 11. Rack 100 storing trays 102 for containing storage target products are arranged in the storage area 10. On the other hand, order preparation stations 12 for operators 13 to process orders are arranged in the order preparation area 11.

To process an order, an automated device 103 transports the tray 102 containing an order target product from the rack 100 to the order preparation station 12. Subsequently, in the order preparation area 11, the tray 102 is transported to in front of the operator 13 by, for example, another operator other than the operator 13, or another system (e.g., conveyer). The operator 13 picks the product from the tray 102, and sorts the picked product as a transportation package 14. As EC markets expand, it is demanded to make such work more efficient. Furthermore, a structure enabling flexible design of a form of an automated storage and retrieval system at various places at which the automated storage and retrieval system is installed is demanded.

The present disclosure has been made in light of the above problem, and an object of the present disclosure is to provide an automated storage and retrieval system which enable flexible design of a form thereof.

SUMMARY

In order to achieve the above object, according to one aspect of the present disclosure, an automated storage and retrieval system is provided, and the automated storage and retrieval system includes: a rack storing a plurality of bins for containing items; a transportation robot transporting the bin in the rack; and a transportation elevator which moves in the rack and can transport the transportation robot. The rack includes a plurality of floors each of which stores each of the plurality of bins, and allows the transportation robot to run along a surface thereof. Furthermore, the rack includes a plurality of support column modules forming a passage of the transportation elevator. Each of the support column modules extends between at least the mutually neighboring floors. One support column module is configured to be able to be coupled to another support column module.

Each of the support column modules includes an engagement member guiding the transportation elevator.

The transportation elevator includes at least one driven part to be rotationally driven, and the engagement member is configured to be able to be engaged with the driven part of the transportation elevator.

The driven part of the transportation elevator is a sprocket, and the engagement member is a roller chain.

Each of the support column modules is configured to be able to support the floor adjacent to the passage of the transportation elevator.

The engagement member of each of the support column modules is configured to be located in a space of the passage of the transportation elevator. Each of the support column modules is configured to be able to support the floor outside the space of the passage of the transportation elevator.

Each of the support column modules includes an insertion plug, an accommodation plug, and a main body extending between the insertion plug and the accommodation plug. The insertion plug and the accommodation plug are configured to be able to be coupled to each other.

The engagement member of the one support column module is configured to be able to be coupled to the engagement member of the another support column module.

DESCRIPTION OF EMBODIMENTS

Figure 1:
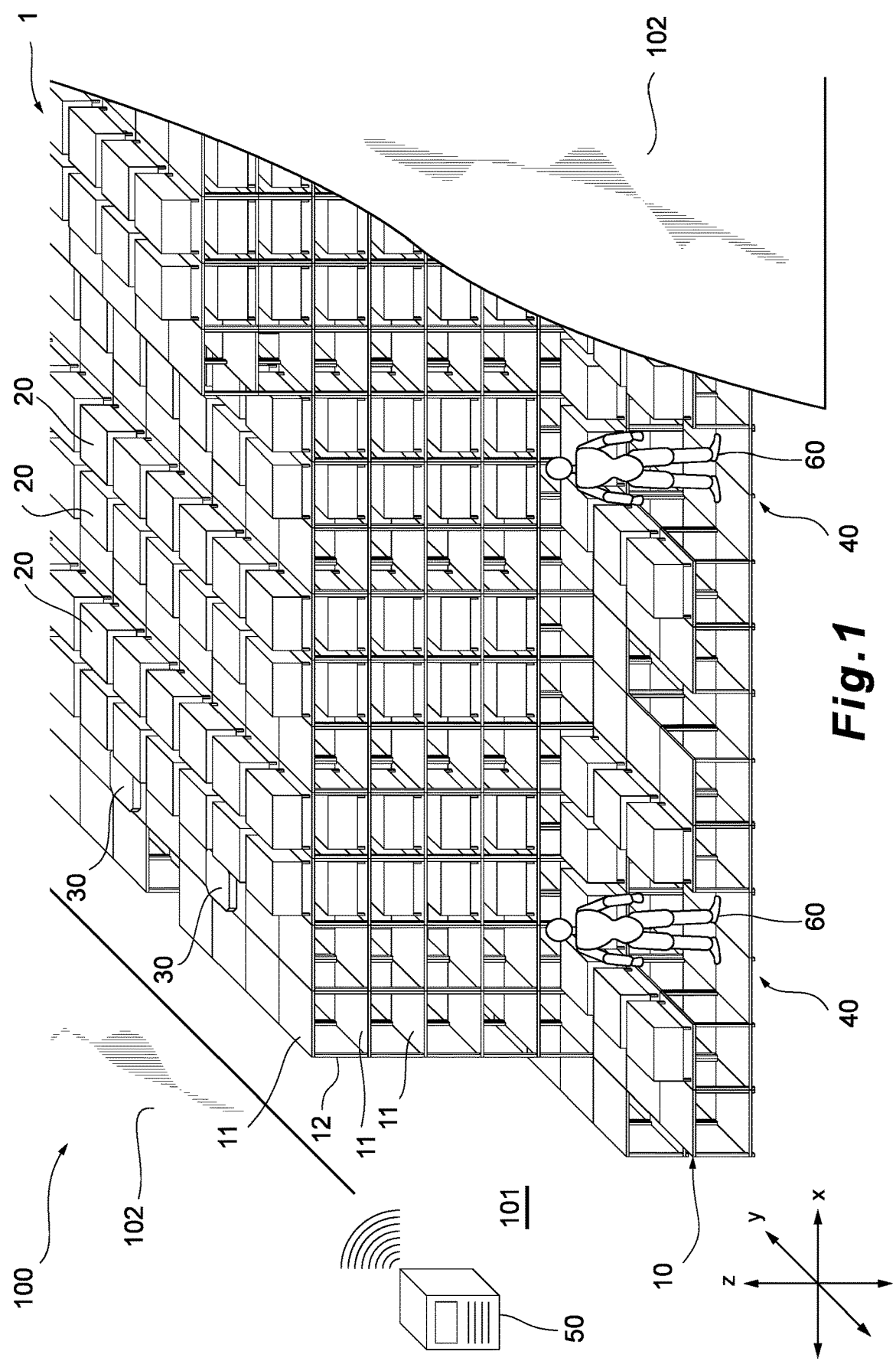
FIG. 1 is a perspective view schematically illustrating an external appearance of an automated storage and retrieval system 1 according to an embodiment of the present disclosure.

Hereinafter, an embodiment of the present disclosure will be described with reference to the accompanying drawings. In all drawings, identical reference numerals are used to refer to identical or similar components. The following embodiment does not intend to limit the disclosure recited in the claims. Examples and features of the disclosed principal will be described in this description, yet can be changed and modified without departing from the idea and the scope of the disclosed embodiment. Furthermore, specific features, structures, or characteristics can be combined by an arbitrary appropriate method in one or more embodiments. The following detailed description is taken into account only as exemplary description, and the true range and idea are intended to be indicated by the claims.

FIG. 1 is a perspective view schematically illustrating an external appearance of an automated storage and retrieval system 1 according to an embodiment of the present disclosure. The automated storage and retrieval system 1 is constructed in, for example, a building 100. The building 100 includes a floor surface 101 extending along a horizontal plane, a plurality of sidewalls 102 vertically standing from the floor surface 101, and a ceiling (not illustrated) supported by the plurality of sidewalls 102. For example, the four sidewalls 102 surrounding four sides, and the ceiling extending in parallel to the floor surface 101 establish an internal space between the floor surface 101, and the sidewalls 102 and the ceiling. The automated storage and retrieval system 1 is constructed in this internal space. Note that part of the sidewalls 102 are cut out for ease of description in FIG. 1. In the building 100, an x axis and a y axis extending in a direction perpendicular to each other on the horizontal plane, and a z axis extending in a vertical direction and perpendicular to the x axis and the y axis are defined.

The automated storage and retrieval system 1 is an automated storage and retrieval system which can automate a series of work from warehousing and storage to delivery of items including products and the like based on centralized management. The automated storage and retrieval system 1 according to the present embodiment includes a rack 10 arranged on the floor surface 101, a plurality of storage bins 20 which are containers stored in the rack 10, a plurality of transportation robots 30 for transporting the storage bins 20, one or more picking stations 40 for picking items including products and the like contained in the storage bins 20, and a management server 50 for managing the series of work of the automated storage and retrieval system 1. At the picking station 40, a human operator 60 performs picking work of picking an item from the storage bin 20.

The rack 10 includes a plurality of floors 11, each of floors 11 defining a surface which extends in parallel to each other along each xy plane, and a plurality of support columns 12 supporting the plurality of floors 11. In the present embodiment, the floors 11 of a first floor to a ninth floor vertically standing in an x axis direction from the floor surface 101 are formed. A total height of the rack 10 from the floor surface 101 in the x axis direction can be set according to a height in the z axis direction of the ceiling of the building 100. Note that part of the floors 11 of the eighth floor and the ninth floor is omitted in FIG. 1 for explanatory convenience, and configurations of the floors 11 of the eighth floor and the ninth floor are configured similar to the floor 11 of the seventh floor.

Figure 2:
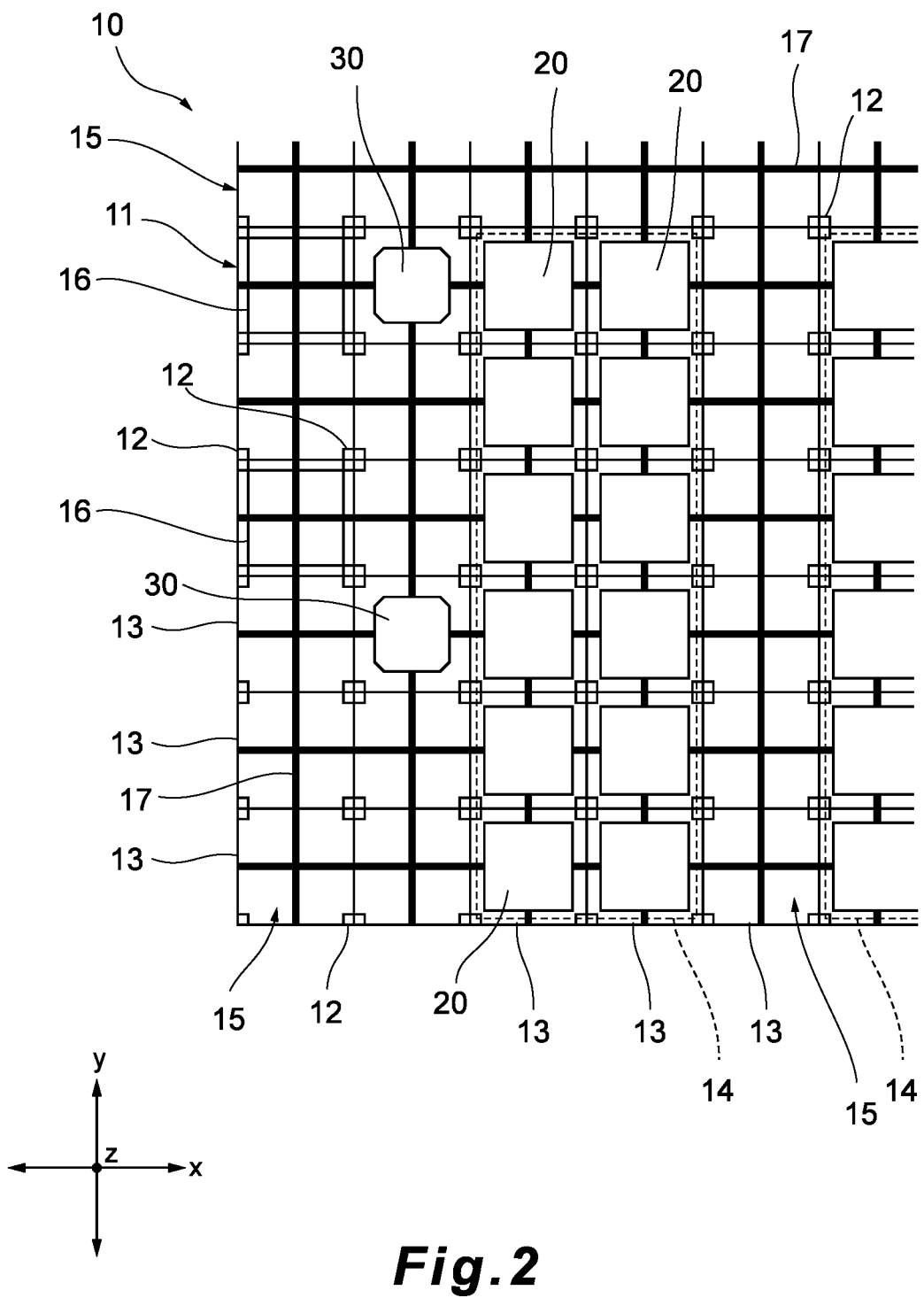
FIG. 2 is a top view schematically illustrating an example of a structure of floors 11 of a rack 10 of the automated storage and retrieval system 1 according to the present embodiment.

FIG. 2 is a top view schematically illustrating an example of a structure of the floor 11 of the rack 10 of the automated storage and retrieval system 1 according to the present embodiment. In the present embodiment, each floor 11 of the rack 10 defines a plurality of sections 13 which are aligned along the xy plane. The section 13 defines, for example, outlines of a square or a rectangle in plan view. In the present embodiment, the support columns 12 are respectively arranged at four corners of the one section 13. The one storage bin 20 occupies the one section 13. Similarly, the one transportation robot 30 occupies the one section 13. That is, an outline of the storage bin 20 and an outline of the transportation robot 30 are respectively arranged in the outline of the one section 13 in plan view. Furthermore, an interval between a pair of the mutually neighboring support columns 12 and 12 is set larger than widths of the transportation robot 30 and the storage bin 20 defined in the x axis direction and a y axis direction.

Each floor 11 defines storage areas 14 including the sections 13 in which the storage bins 20 are aligned, and movement passages 15 of the transportation robots 30 including the sections 13 other than the storage areas 14. In the illustrated example, for example, two rows of bin groups of the plurality of storage bins 20 aligned along the y axis direction are aligned in the x axis direction in the storage area 14. That is, all of the storage bins 20 making up the bin group of these two rows of the storage bins 20 face the movement passages 15 at all times. On the other hand, the transportation robots 30 can run on the movement passages 15. As described later, the transportation robot 30 can also run in the storage area 14, through a space below a bottom surface of the storage bin 20.

Figure 3:
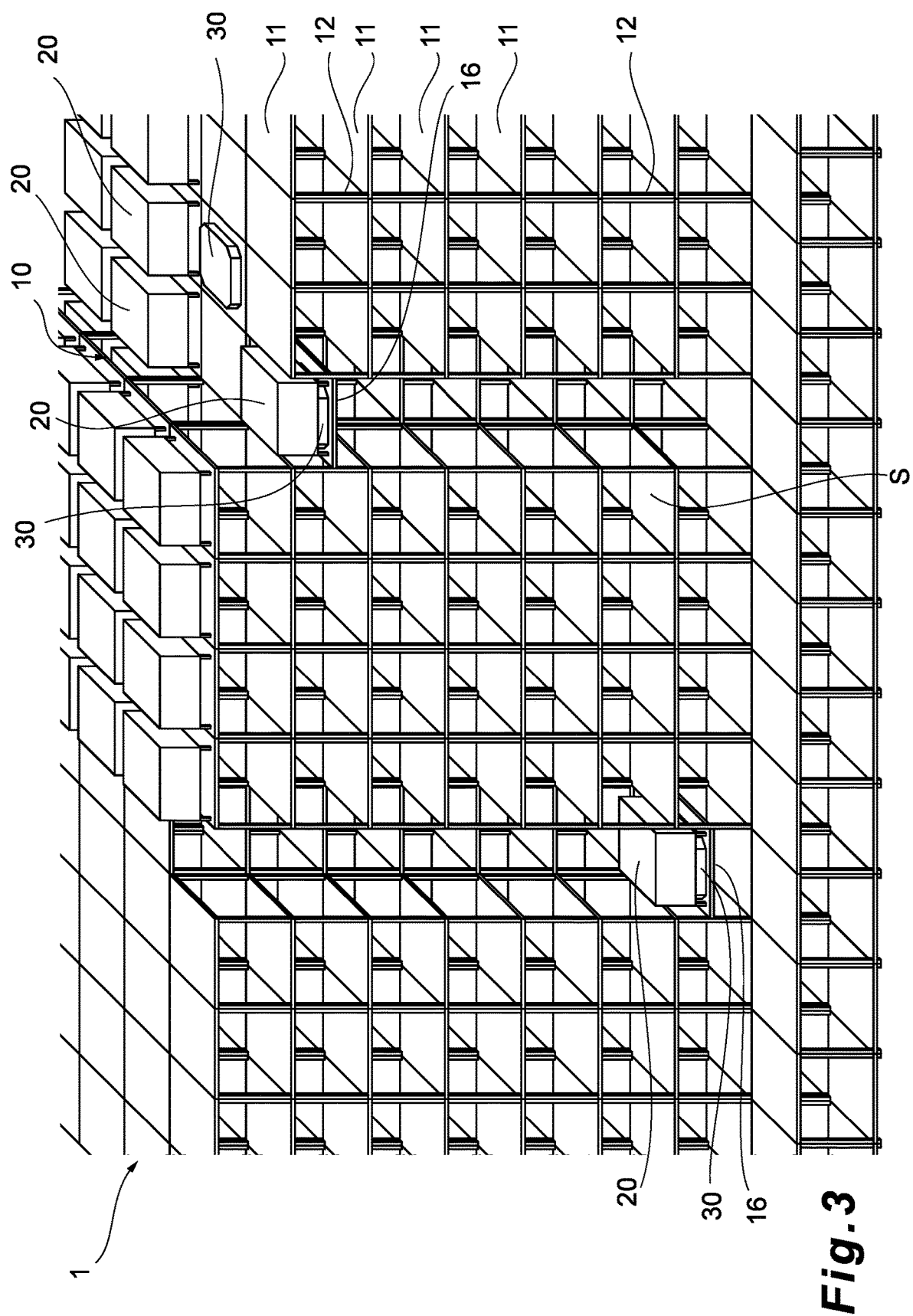
FIG. 3 is a perspective view schematically illustrating an example of a structure of the rack 10 of the automated storage and retrieval system 1 according to the embodiment.

FIG. 3 is a perspective view schematically illustrating an example of a structure of the rack 10 of the automated storage and retrieval system 1 according to the embodiment. Referring to FIGS. 1 to 3 together, the rack 10 includes one or more transportation elevators 16. The transportation elevators 16 can make reciprocating movement in the z axis direction from the first floor to the ninth floor of the floors 11, and stop each floor 11. Each transportation elevator 16 is arranged in one section in the movement passage 15 of the transportation robot 30 on each floor 11. In the present embodiment, the plurality of transportation elevators 16 may be provided to the rack 10. The transportation elevator 16 can have only the transportation robot 30 get thereon or have the transportation robot 30 holding the storage bin 20 get thereon to move to each floor of the first floor to the ninth floor.

The transportation elevator 16 includes, for example, shafts of four corners attached to the rack 10 and extend in the z axis direction, four roller chains attached to the respective shafts, and extend in the z axis direction, four sprockets enmeshing with the respective chains, and two electric motors (both of which are not illustrated) for respectively rotating and driving, for example, the two sprockets. The sprockets enmesh with the roller chains in response to rotation of the sprockets caused by the power of electric motors to ascend and descend the transportation elevator 16. Note that the shafts may be formed by the support columns 12 of the rack 10. The above mechanism is a mere example, and an arbitrary another mechanism realizing vertical movement of the transportation elevator 16 may be used.

Figure 4:
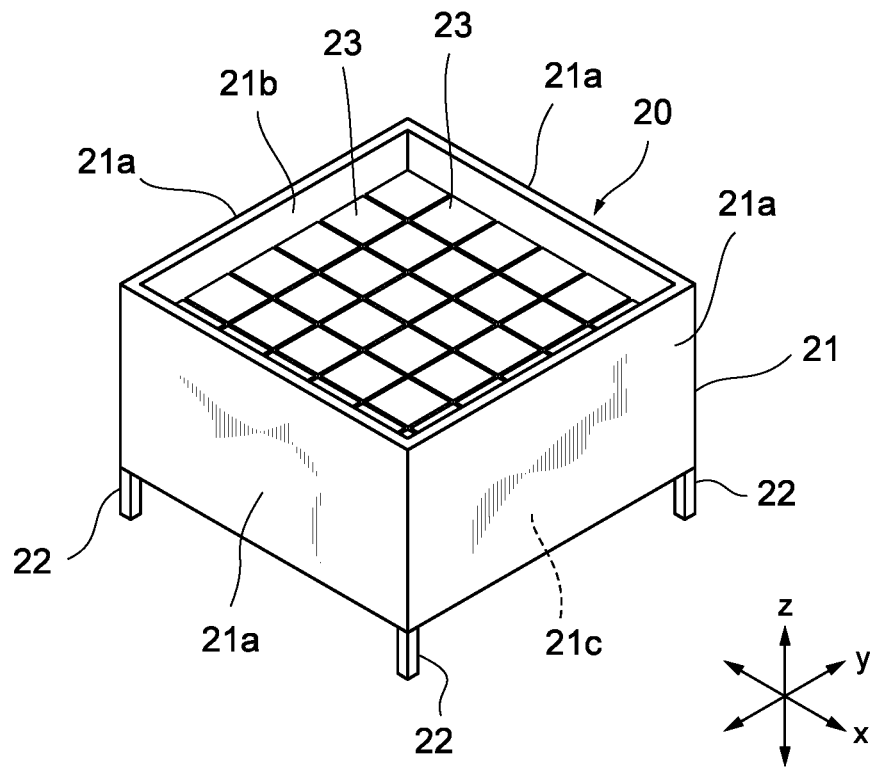
FIG. 4 schematically illustrates an example of a structure of a storage bin 20 of the automated storage and retrieval system 1 according to the embodiment.

FIG. 4 schematically illustrates an example of the structure of the storage bin 20 of the automated storage and retrieval system 1 according to the embodiment. In the present embodiment, the storage bin 20 includes a bin main body 21 defining an internal space of, for example, a cuboid, and four support legs 22 extending downward from four corners of a bottom surface of the bin main body 21. The bin main body 21 includes four sidewalls 21a surrounding four sides, an opening part 21b opened along upper ends of the sidewalls 21a, and a bottom surface 21c closed along lower ends of the sidewalls 21a. Although the opening part 21b is opened in the present embodiment, the opening part 21b may be closed with, for example, a lid or a cover. The sidewalls 21a extend along the xz plane or the yz planei. Furthermore, the bottom surface 21c extends along the xy plane. The storage bin 20 is in contact with the floor 11 with the four support legs 22. The storage bin 20 may be formed by, for example, a resin material. Furthermore, the storage bin 20 may be a foldable bin. A size of the storage bin 20 is preferably set appropriately based on a size of the rack 10 or each floor 11 or a size of an item 23.

The one or more items 23 are contained in the internal space in the bin main body 21. The item 23 can be identified by, for example, a unique Stock Keeping Unit (SKU) set to the item 23. Although the item 23 is, for example, one unit of a product or the like, the item 23 may be a so-called case product packaged in a unit of a plurality of identical products. Furthermore, the one storage bin 20 may contain only the items 23 of one type, or may contain the items 23 of a plurality of types. The storage bin 20 can be identified based on a unique ID set to each storage bin 20. The unique ID of this storage bin 20 is managed in correspondence with the SKU of the item 23 contained in the storage bin 20.

Figure 5:
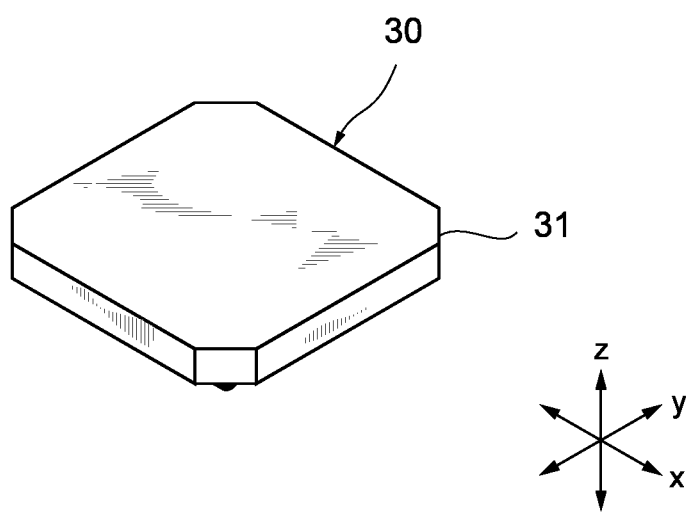
FIG. 5 is a perspective view schematically illustrating an external appearance of a transportation robot 30 of the automated storage and retrieval system 1 according to the embodiment.

FIG. 5 is a perspective view schematically illustrating an external appearance of the transportation robot 30 of the automated storage and retrieval system 1 according to the embodiment. In the present embodiment, a plurality of the transportation robots 30 is preferably arranged on each floor 11 of the rack 10. The transportation robot 30 is, for example, an autonomous running transportation robot including a thin housing 31 of a substantially cuboid shape. The housing 31 is formed by, for example, a resin material. The transportation robot 30 can run along a line 17 (see, for example, FIG. 2) by tracing the line 17 drawn on the floor 11 of the rack 10 (line tracing function). The line 17 is lines of two directions which extend passing center positions of the x axis direction and the y axis direction in, for example, each section 13, and are perpendicular to each other at a center of the section 13. These lines 17 are drawn in all of the sections 13 including the storage areas 14, the movement passages 15, and the transportation elevators 16 of the floor 11.

An upper surface of the housing 31 of the transportation robot 30 extends flat along the xy plane. A height of the transportation robot 30 is set smaller than the height of the support leg 22 of the storage bin 20. Furthermore, an outline of the housing 31 in top view is defined substantially as, for example, a square. Similarly, the length of one side of the transportation robot 30 is set smaller than the length of each side of the storage bin 20. That is, the transportation robot 30 can enter the space below the bin main body 21 from between the pair of mutually neighboring support legs 22 of the storage bin 20. In this regard, the size of the transportation robot 30 is preferably set appropriately based on sizes of the rack 10, each floor 11, and the storage bin 20.

Figure 6:
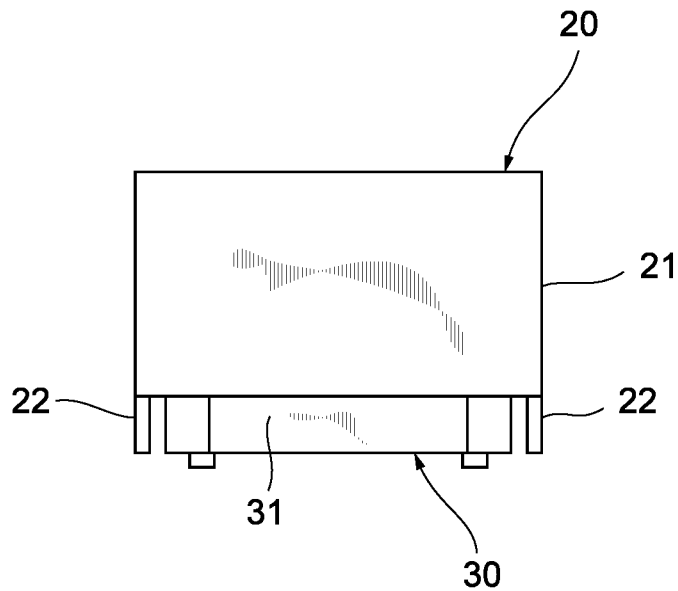
FIG. 6 is a side view illustrating a state where the transportation robot 30 of the automated storage and retrieval system 1 according to the embodiment lifts the storage bin 20.

The transportation robot 30 can change the height thereof between a first configuration where the height of the upper surface of the housing 31 is set to a first height, and a second configuration where the height is set to a second height higher than the first height. As described above, the transportation robot 30 of the first configuration can enter the space below the bin main body 21 from between the pair of mutually neighboring support legs 22 of the storage bin 20. In this case, when the transportation robot 30 changes the height of the housing 31 from the first configuration to the second configuration, the transportation robot 30 holds the storage bin 20 on the upper surface of the housing 31 as illustrated in FIG. 6. As a result, the storage bin 20 can be lifted from the floor 11. The transportation robot 30 can run in both of the first configuration and the second configuration. That is, the transportation robot 30 can run on the floor 11 while lifting the storage bin 20.

Back to FIG. 1, in the present embodiment, the picking stations 40 are established along, for example, the peripheral edge of the surface of the floor 11 of the rack 10. That is, the picking station 40 is established in, for example, the rack 10. In the present embodiment, for example, the two picking stations 40 are established on the floor 11 of the second floor of the rack 10. The picking station 40 is a station for picking the item 23 from the storage bin 20 transported by the transportation robot 30 from the rack 10. The operator 60 can execute picking work (delivery work) taking a standing posture on, for example, the surface of the floor 11 of the first floor. Note that details of a configuration of the picking station 40 will be described later.

The management server 50 manages all of the rack 10, the storage bins 20, the transportation robots 30, the transportation elevators 16, and the picking stations 40 for warehousing, storage, and delivery of the automated storage and retrieval system 1. This management is realized when a program stored in a storage unit is executed by a control unit as described later. More specifically, operations and processing of the transportation robots 30, the transportation elevators 16, and the picking stations 40 are executed according to information processing described in the program. That is, the information processing described in the program functions as specific means collaborated by software in correspondence with the program, and various hardware resources of the automated storage and retrieval system 1 when the program is read by the control unit.

Figure 7:
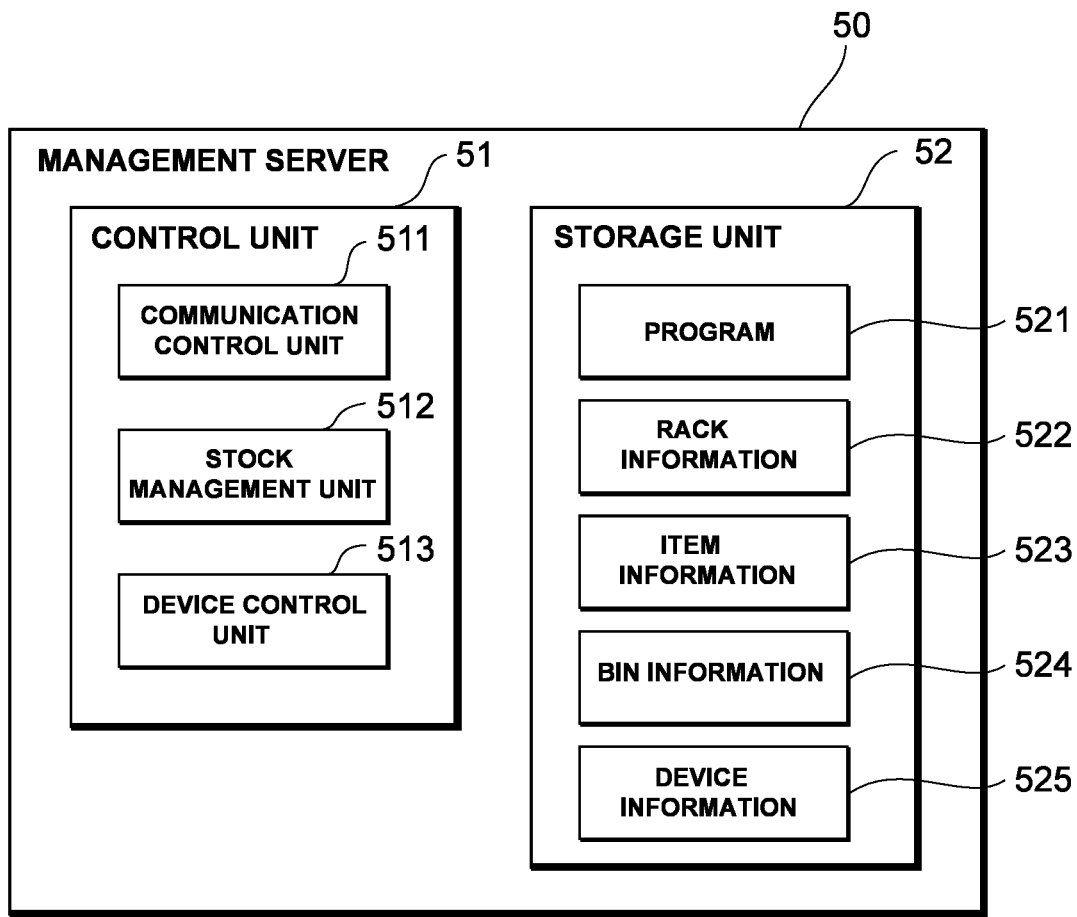
FIG. 7 is a functional block diagram schematically illustrating a configuration of a management server 50.

FIG. 7 is a functional block diagram schematically illustrating a configuration of the management server 50. As illustrated in FIG. 7, the management server 50 includes a control unit 51 and a storage unit 52. The control unit 51 includes a communication control unit 511, a stock management unit 512, and a device control unit 513. On the other hand, the storage unit 52 stores a program 521, rack information 522, item information 523, bin information 524, and device information 525. The control unit 51 manages the automated storage and retrieval system 1 by executing the program 521 stored in the storage unit 52. This management server 50 may be realized on a physical server, yet may be realized on, for example, a cloud server.

The communication control unit 511 controls communication between the management server 50 and at least the transportation robot 30 and a terminal of the operator 60 at the picking station 40. A communication method may be, for example, Wi-Fi (registered trademark), Ethernet (registered trademark), optic or the like. The stock management unit 512 manages a stock status of the automated storage and retrieval system 1. More specifically, the stock management unit 512 associates and manages information (SKU) for identifying each item 23, information related to the number of stocks of each item 23 specified based on the SKU, information (ID) for identifying the storage bin 20 in which the item 23 is stored, and information related to a position of the section 13 of the floor 11 in which the storage bin 20 is stored. Each of these pieces of information is stored as the rack information 522, the item information 523, and the bin information 524 in the storage unit 52.

The device control unit 513 manages and controls at least states and operations of the transportation robots 30 and the picking stations 40. More specifically, the device control unit 513 associates and manages information for identifying the transportation robot 30, information related to a current state of the transportation robot 30, i.e., a charging state of the transportation robot 30, information related to whether or not the transportation robot 30 engages in transportation, information related to order processing in which the transportation robot 30 engages in a case where the transportation robot 30 engages in the transportation, and information related to a current position of the transportation robot 30 at the floor 11 of the rack 10 or the picking station 40. The information related to the order processing includes, for example, information related to transportation of which item 23 of the order processing the transportation robot 30 engages in. Each of these pieces of information is stored as the device information 525 in the storage unit 52. Furthermore, the device control unit 513 associates and manages information for identifying the picking station 40, and information related to an order for which picking work is executed at the picking station 40. Each of these pieces of information is stored as the device information 525 in the storage unit 52.

Furthermore, the device control unit 513 generates commands for the transportation robot 30 and the transportation elevator 16 per order processed by the automated storage and retrieval system 1. More specifically, the device control unit 513 specifies the storage bin 20 for containing the item 23 designated by the order based on each of the above pieces of information, and specifies the transportation robot 30 which needs to be assigned to transport the storage bin 20. The device control unit 513 specifies a movement route R1 (referred to as a "robot route" below) of the transportation robot 30 to the section 13 in which the storage bin 20 is stored, and a movement route R2 (referred to as a "bin route" below) of the transportation robot 30 from the section 13 to the picking station 40 which is a destination. These pieces of generated information are transmitted as commands to the transportation robot 30 via the communication control unit 511.

Figure 8:
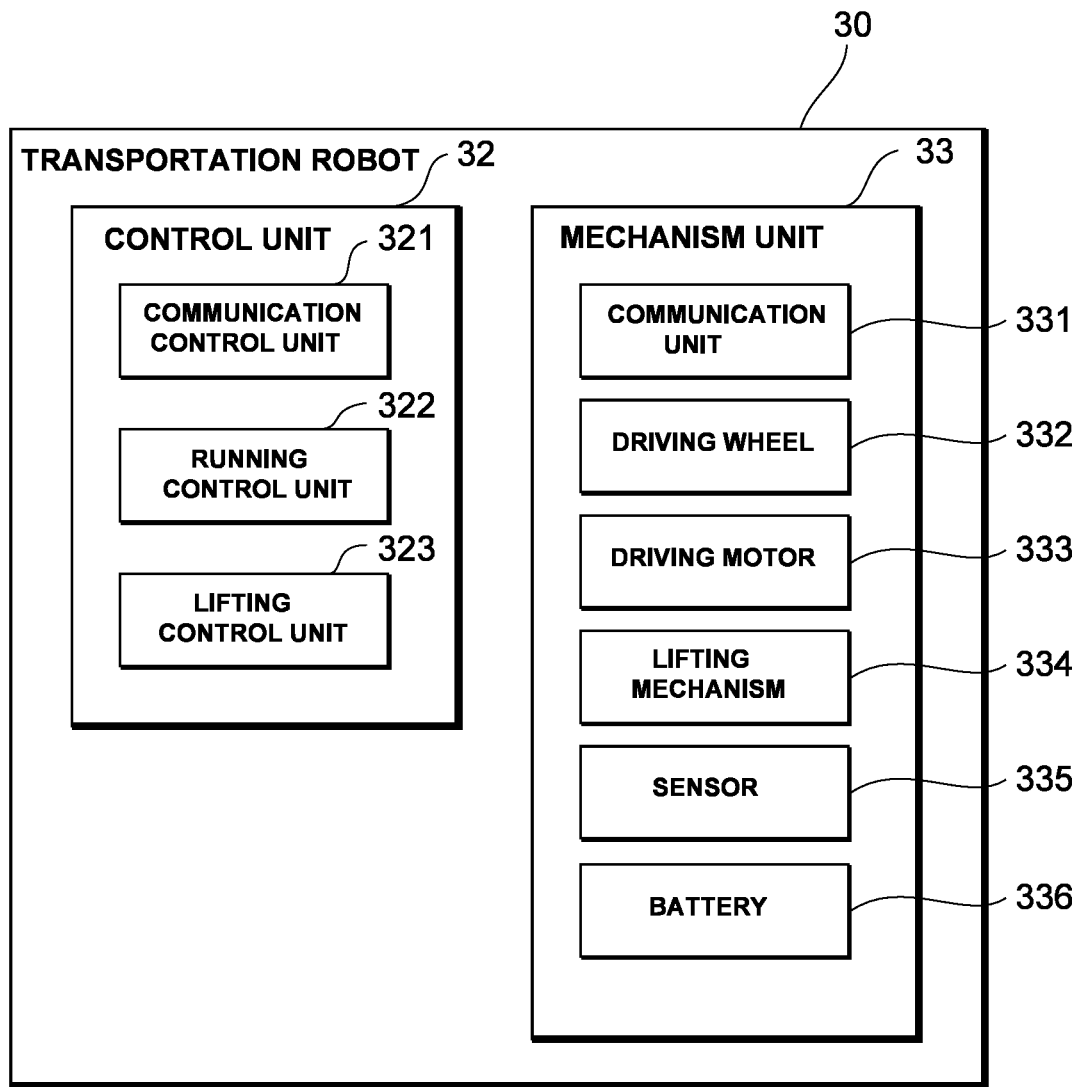
FIG. 8 is a functional block diagram schematically illustrating a configuration of the transportation robot 30.

FIG. 8 is a functional block diagram schematically illustrating a configuration of the transportation robot 30. As illustrated in FIG. 8, the transportation robot 30 includes a control unit 32 and a mechanism unit 33. The control unit 32 includes a communication control unit 321, a running control unit 322, and a lifting control unit 323. The mechanism unit 33 includes a communication unit 331, a plurality of driving wheels 332, a plurality of driving motors 333, a lifting mechanism 334, a sensor 335, and a battery 336. The control unit 32 controls an operation of the transportation robot 30 by executing a program (not illustrated) stored in the storage unit (not illustrated). The program may be stored in a physical storage unit incorporated in the transportation robot 30, yet may be stored on, for example, a cloud server.

The communication unit 331 establishes communication between at least the management server 50, the transportation elevator 16, and the terminal of the operator 60 at the picking station 40. A communication method may be, for example, Wi-Fi (registered trademark), Ethernet (registered trademark), optic or the like. Communication performed by the communication unit 331 is controlled by the communication control unit 321. The driving wheel 332 is a wheel for realizing running of the transportation robot 30. The plurality of driving motors 333 drive the driving wheels 332 and the lifting mechanism 334. Driving of the driving wheels 332 is controlled by the running control unit 322. The lifting mechanism 334 establishes the above-described first configuration and second configuration by lifting the housing 31 of the transportation robot 30. An operation of this lifting mechanism 334 is controlled by the lifting control unit 323.

The sensor 335 is, for example, an optical sensor for realizing the above-described line tracing function. More specifically, the sensor 335 is used to control running of the transportation robot 30 along the line 17 by reading a boundary of the line 17 drawn on each section 13. Furthermore, although the two strips of the lines 17, 17 cross at the center of each section 13, the sensor unit 337 reads the line 17 perpendicular to the line 17 along which the transportation robot 30 is running, so that the transportation robot 30 can specify the center position of each section 13. Thus, the transportation robot 30 can stop at, for example, the center position of each section 13. The battery 336 is, for example, a rechargeable battery. On each floor 11 of the rack 10, one or more charging spots (not illustrated) which enable charging of the battery 336 of the transportation robot 30 may be formed.

Figure 9:
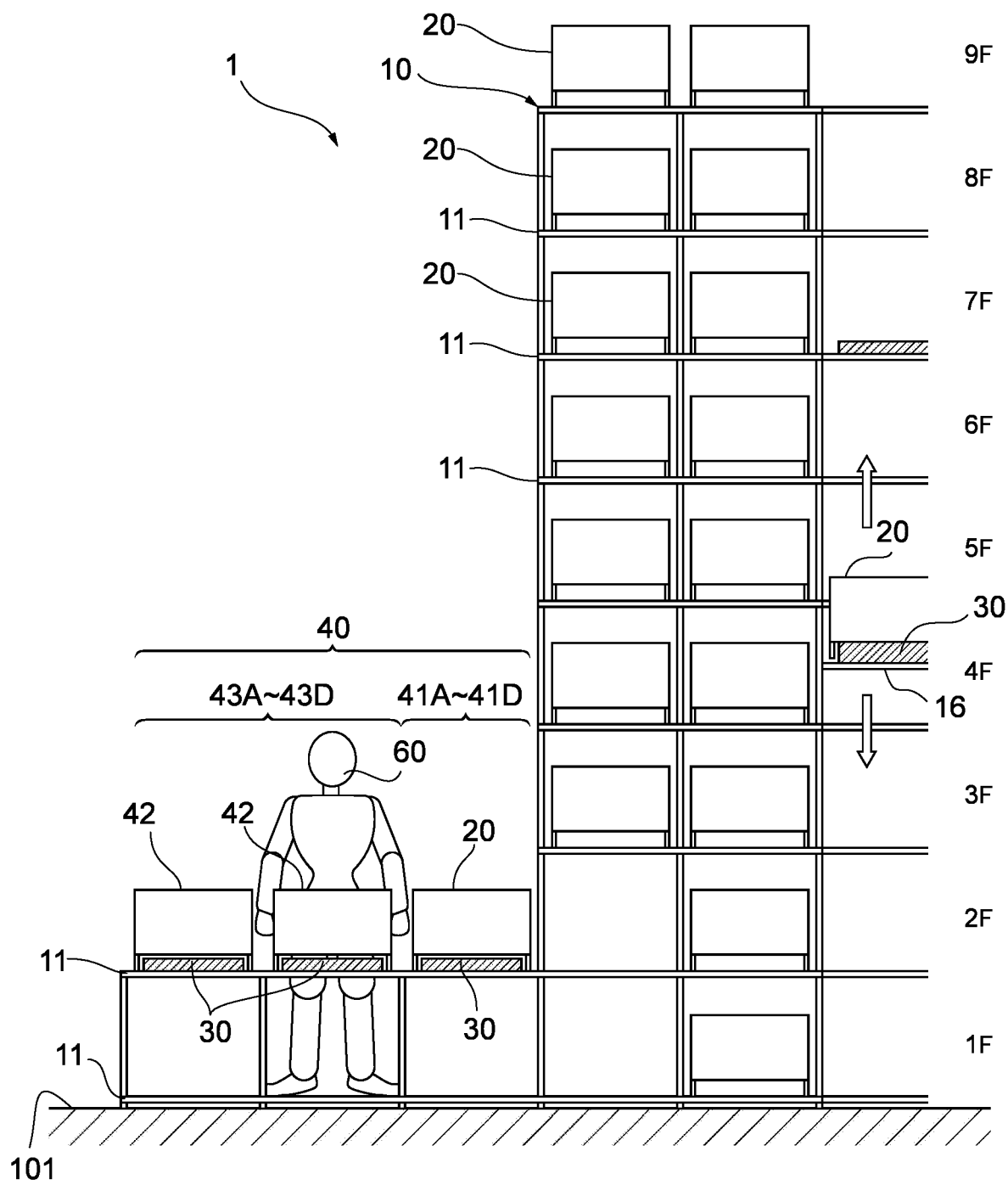
FIG. 9 is a side view of the rack 10 schematically illustrating an example of a configuration of a picking station 40 of the automated storage and retrieval system 1 according to the embodiment.
Figure 10:
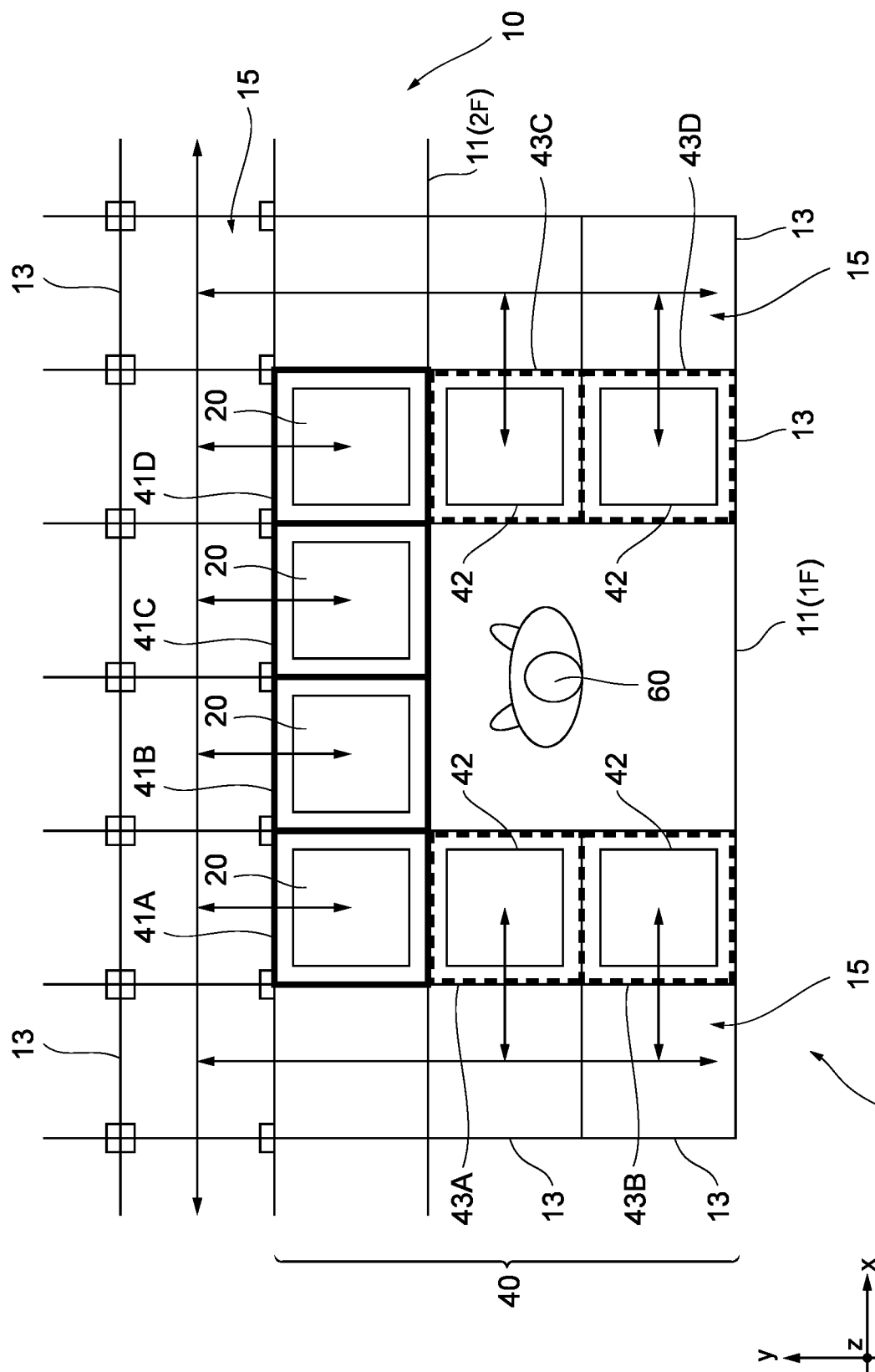
FIG. 10 is a plan view of the rack 10 schematically illustrating an example of a configuration of the picking station 40 of the automated storage and retrieval system 1 according to the embodiment.

FIG. 9 is a side view of the rack 10 schematically illustrating an example of the configuration of the picking station 40 of the automated storage and retrieval system 1 according to the embodiment. FIG. 10 is a plan view of the rack 10 schematically illustrating the example of the configuration of the picking station 40 of the automated storage and retrieval system 1 according to the embodiment. As illustrated in FIG. 9, the picking station 40 is established continuing to this floor 11 at the peripheral edge of the floor 11 of the second floor of the rack 10. More specifically, the picking station 40 is formed on the surface of the floor 11 of the second floor which extends in, for example, the y axis direction toward an outer side of an outer peripheral edge of the floors 11 of the third floor to the ninth floor. In the present embodiment, similar to the floor 11 of the second floor, the floor 11 of the first floor also extends toward the outer side of the outer peripheral edges of the floors 11 of the third floor to the ninth floor. The operator 60 stands on the surface of the floor 11 of the first floor, and does work of picking the item 23 from the storage bin 20. The height of the surface of the floor 11 of the second floor is suitable for the operator 60 whose height is, for example, 165 cm which is an average height of adults to do the work.

As illustrated in FIG. 10, the picking station 40 defines a plurality of picking positions 41A to 41D at which the storage bins 20 used for picking work of the item 23 are arranged on the floor 11 of the second floor. In the present embodiment, for example, the four picking positions 41A to 41D are aligned adjacent to each other in the x axis direction along the peripheral edge of the second floor 11 of the rack 10. Each of the picking positions 41A to 41D occupies the one section 13 of the floor 11. The picking positions 41A to 41D are aligned in front of the operator 60 facing the rack 10, and the picking positions 41B and 41C of the picking positions 41A to 41D directly face the operator 60. As is apparent from FIG. 9, the upper floors 11 do not extend to a space above the picking positions 41A to 41D in the z axis direction. In this regard, the upper floors 11 may extend to the space above the picking positions 41A to 41D in the z axis direction.

On the floor 11 of the second floor, for example, the two sections 13 extend toward the outer side in the y axis direction from the picking positions 41A and 41D. These four sections 13 in total define loading positions 43A to 43D at which the items 23 are loaded to shipment bins 42 which need to be shipped to clients of orders. Each of the loading positions 43A to 43D occupies the one section 13 of the floor 11. The shipment bin 42 employs the same configuration as that of the storage bin 20. According to the present embodiment, all of the loading positions 43A to 43D are aligned to a side of the operator 60 who faces the rack 10, and directly face the operator 60. Thus, as is clear from FIG. 10, the four picking positions 41A to 41D and the four loading positions 43A to 43D are aligned surrounding the operator 60 on the floor 11 of the second floor.

Furthermore, the sections 13 further surrounding the four picking positions 41A to 41D and the four loading positions 43A to 43D define the movement passage 15 of the transportation robot 30 on the floor 11 of the second floor. Although FIG. 10 omits illustration of the lines 17 for ease of description, the lines 17 are drawn in all of the sections 13 in which the four picking positions 41A to 41D and the four loading positions 43A to 43D, and the movement passages 15 are formed. Thus, as indicated by arrows in FIG. 10, the transportation robot 30 can enter the four picking positions 41A to 41D and the four loading positions 43A to 43D from the movement passages 15. Note that the storage bin 20 is not arranged in the sections 13 forming the movement passages 15. Thus, the transportation robot 30 can transport the storage bin 20 between the storage area 14 of the rack 10 and the four picking positions 41A to 41D. On the other hand, the transportation robot 30 can transport the shipment bin 42 on which the item 23 has been loaded, to, for example, a shipping station (not illustrated) established in the rack 10.

Although the storage bins 20 are aligned on each floor 11 of the rack 10 as is apparent from FIG. 9, the storage bins 20 for containing the items 23 of higher inventory turnover ratios are preferably aligned on the lower floors 11. In other words, the storage bins 20 for containing the items 23 of lower inventory turnover ratios are preferably aligned in the upper floors 11. In the present embodiment, the picking stations 40 are established on the floor 11 of the second floor, and therefore the items 23 of lower inventory turnover ratios are stored on the upper floors 11 for which physical movement distances of the transportation robots 30 from the second floor are assumed to be long. Similarly, the items 23 of higher inventory turnover ratios are stored on the floors 11 which are close to the second floor and to which physical movement distances are assumed to be short, or the second floor for which the transportation elevator 16 does not need to be used. Furthermore, the picking stations 40 are not limited to the picking stations provided adjacent to the floor 11 of the second floor. The picking stations 40 may be provided adjacent to the other floors 11 likewise according to installation environment such as a shape, a size, and the like of a warehouse in which the automated storage and retrieval system 1 is installed, or a control mode or the like of the automated storage and retrieval system 1. Furthermore, the automated storage and retrieval system 1 may be provided with the plurality of picking stations 40. Furthermore, the picking positions are not limited to the above-described four picking positions 41A to 41D, and the loading positions are not limited to the above-described four loading positions 43A to 43D.

Figure 11:
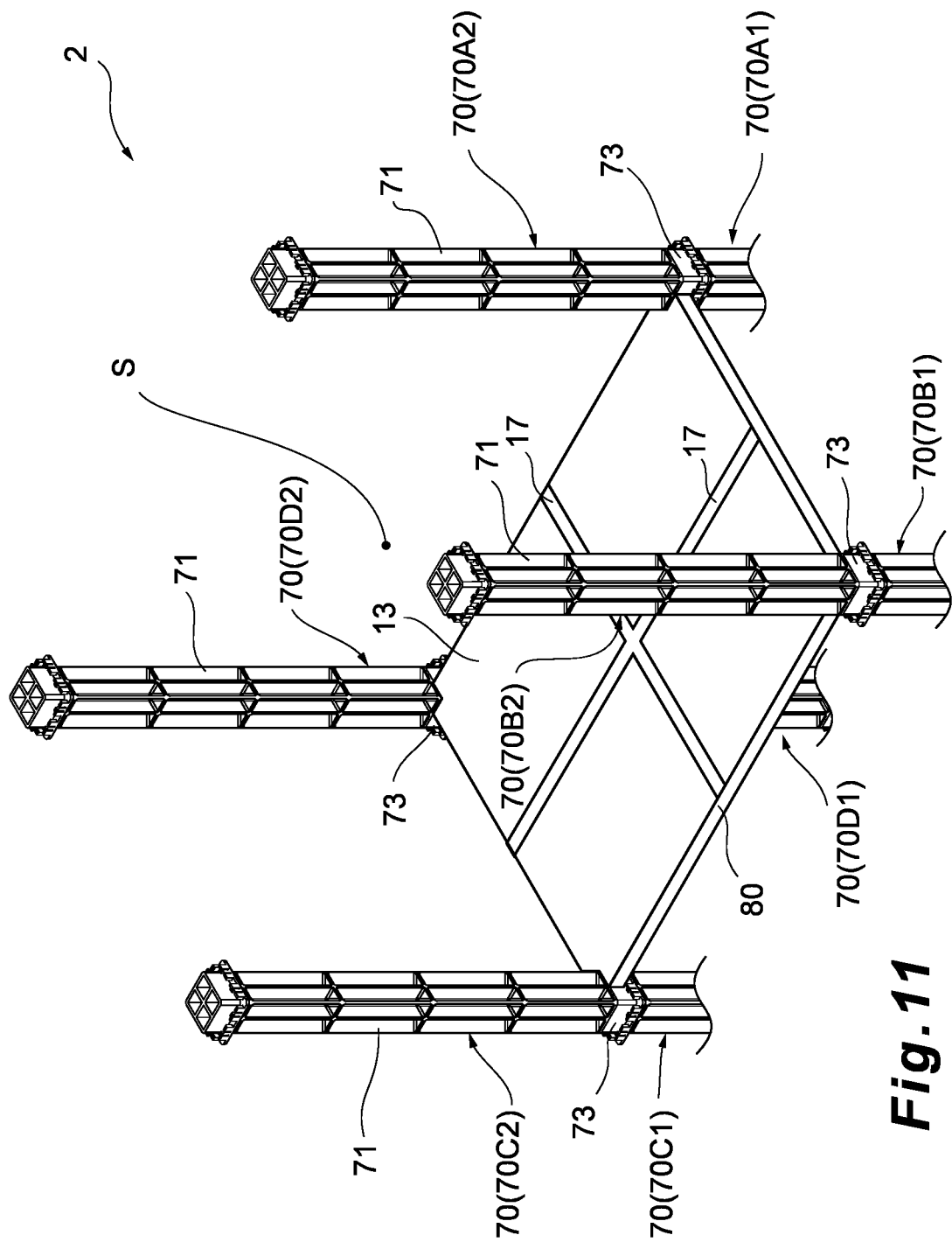
FIG. 11 is a perspective view illustrating a schematic configuration of a rack module 2 included in the rack 10.

Next, a configuration of the rack 10 will be specifically described. FIG. 11 is a perspective view illustrating a schematic configuration of a rack module 2 included in the rack 10. The rack 10 includes the plurality of rack modules 2, and is formed by connecting the plurality of rack modules 2. Furthermore, as described above, the rack 10 stores the plurality of storage bins 20, and includes the plurality of floors 11 allowing the transportation robots 30 to run along surfaces thereof. The rack module 2 includes a floor module 80 which is part of each floor 11, and a plurality of support column modules 70 supporting the floor module 80. A configuration of the rack module 2 will be specifically described below.

The rack module 2 is a minimum unit structure making up the rack 10, and the rack 10 is formed by the plurality of rack modules 2. More specifically, the rack 10 is formed by coupling the plurality of rack modules 2 in a horizontal direction and the vertical direction. The rack module 2 forms a zone space S in the rack 10. The zone space S is a space corresponding to the section 13 of the floor 11, and is a space between the neighboring sections 13 in the z direction (see FIG. 3). That is, each zone space S is a space in which the one storage bin 20 is stored, and is a minimum unit space making up the storage area 14, and each zone space S is a minimum unit space making up the movement passage 15. Note that, although part of components is shared between the neighboring rack modules 2, the shared components are also components of each rack module 2.

Figure 12A:
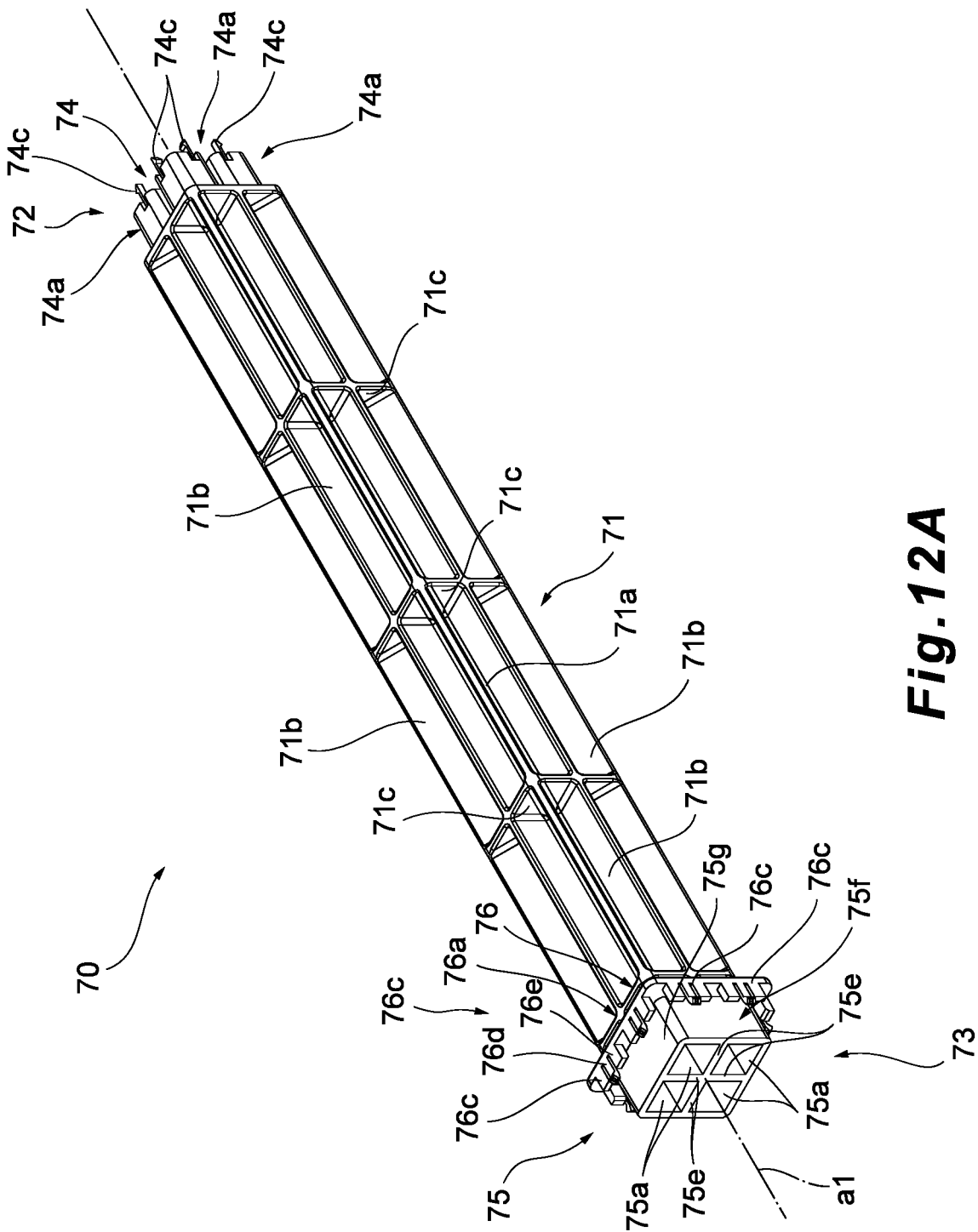
FIGS. 12A and 12B are perspective views of a support column module 70 included in the rack module 2.
Figure 12B:
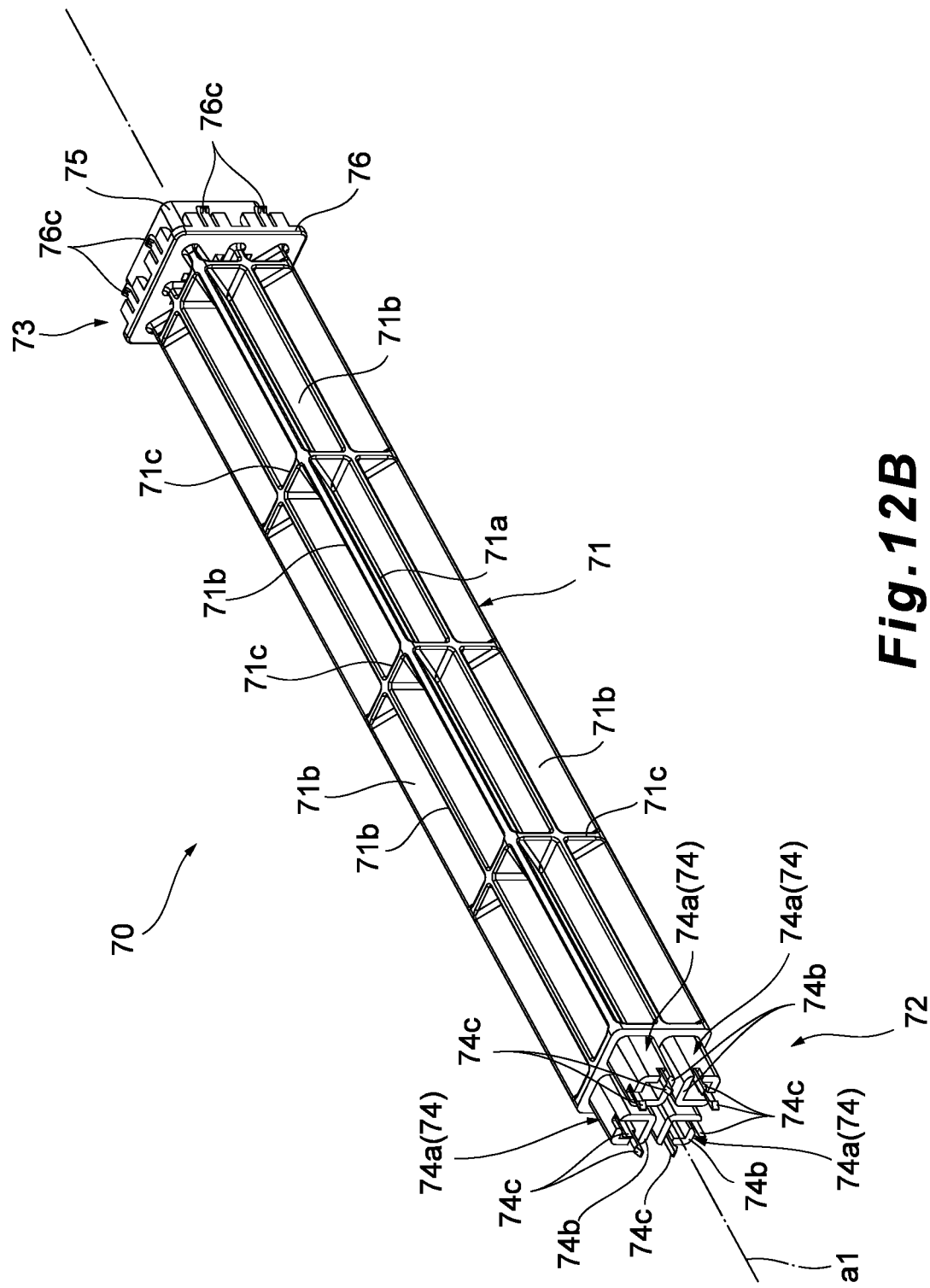
Figure 13A:
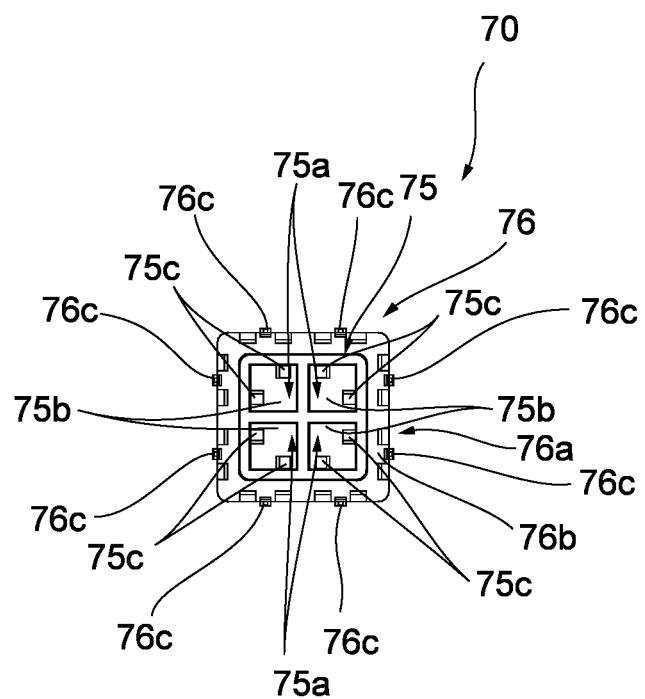
FIG. 13A is a plan view of the support column module 70.
Figure 13B:
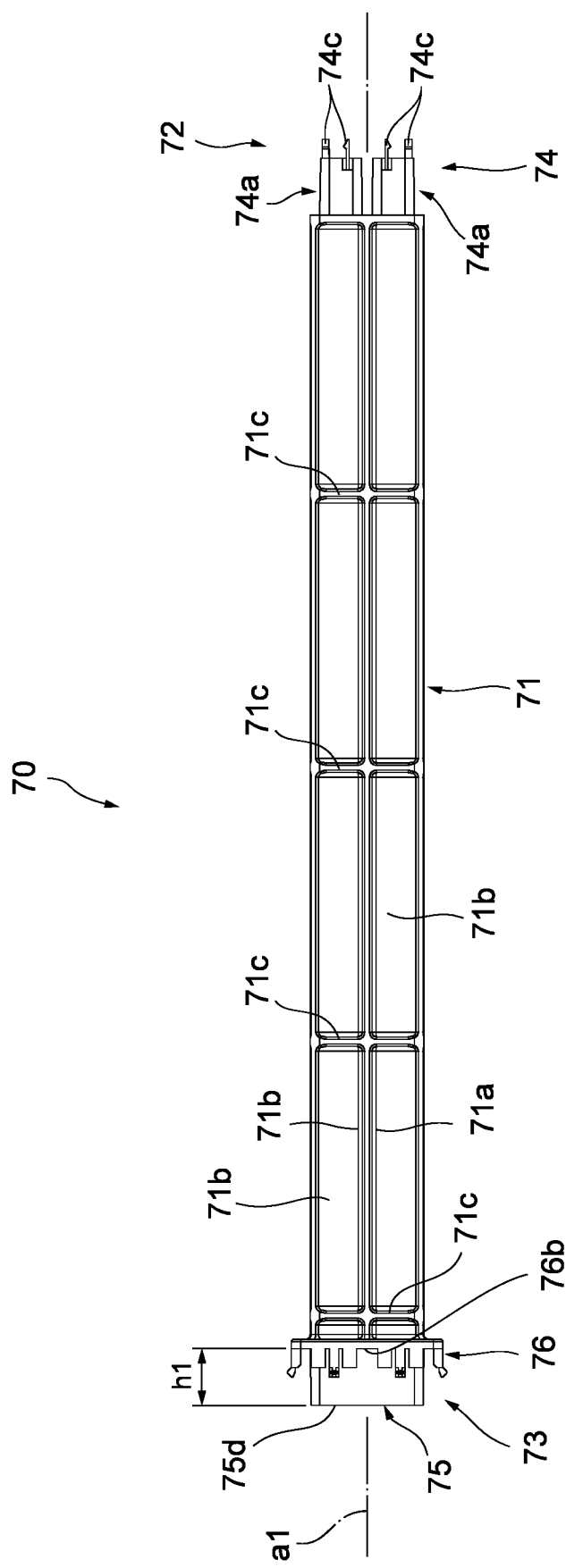
FIG. 13B is a right side view of the support column module 70.
Figure 13C:
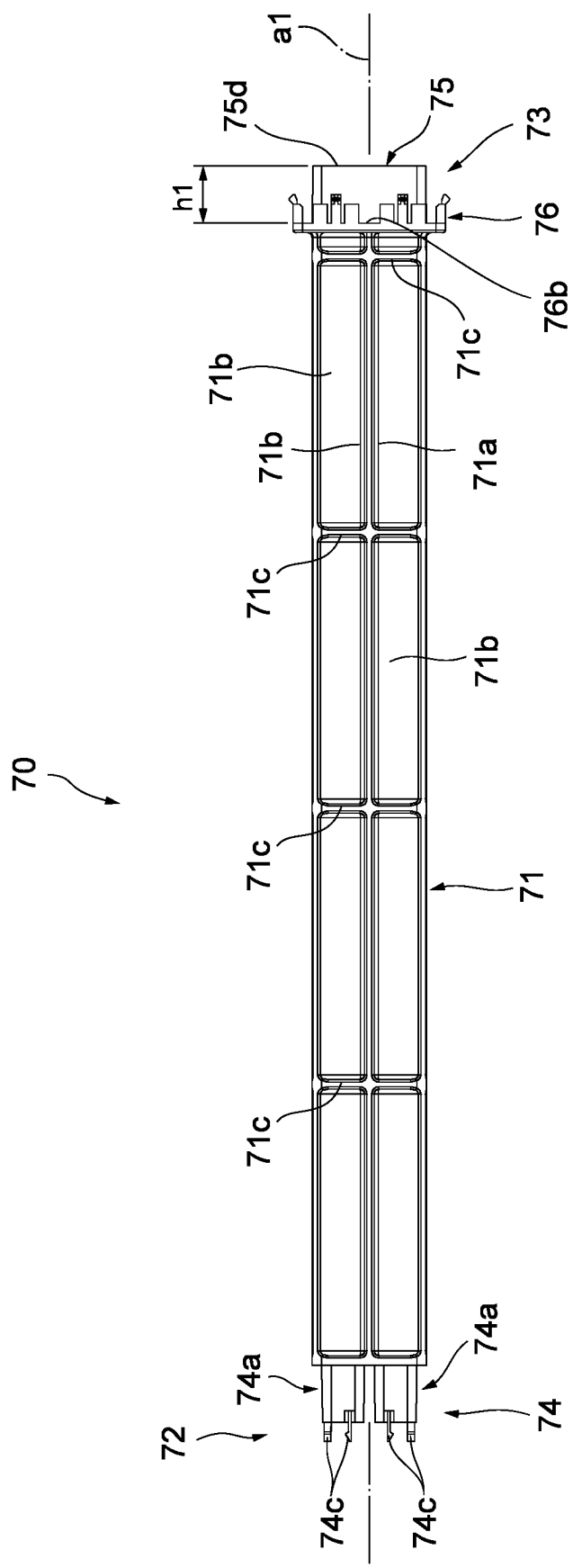
FIG. 13C is a left side view of the support column module 70.
Figure 13D:
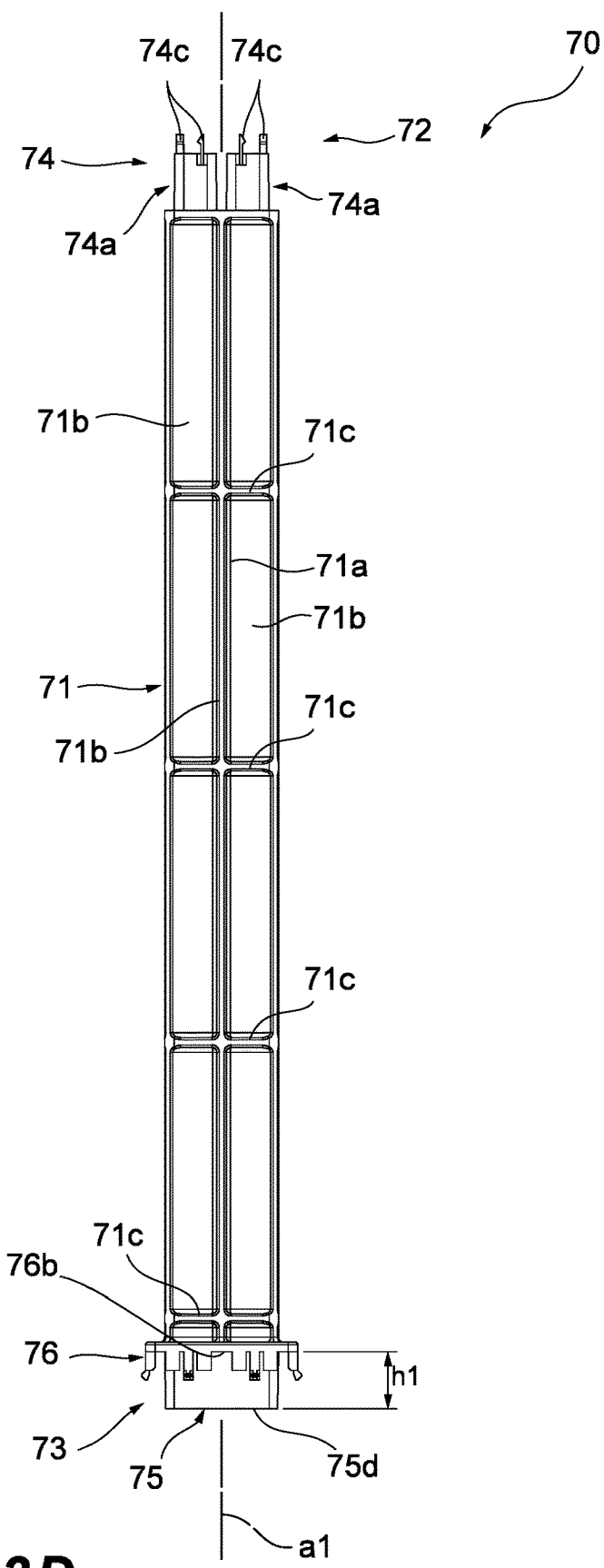
FIG. 13D is a top view of the support column module 70.
Figure 13E:
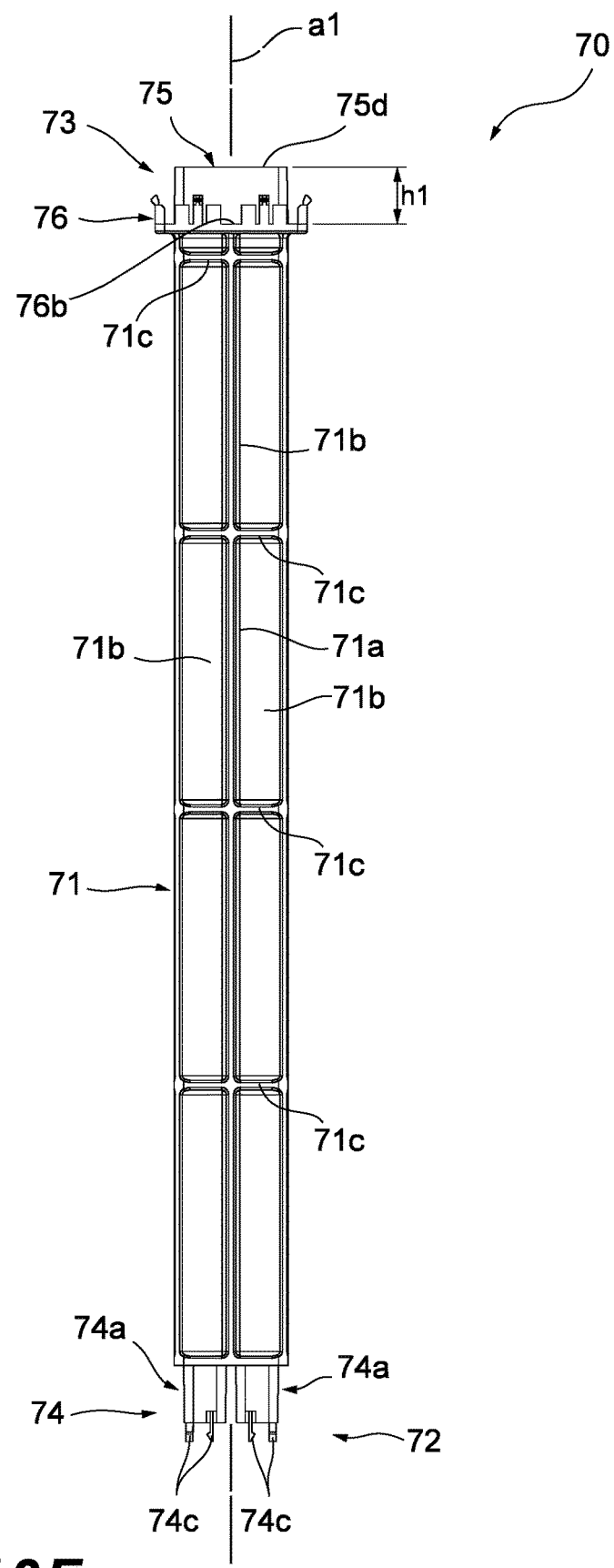
FIG. 13E is a bottom view of the support column module 70.

More specifically, as illustrated in FIG. 11, each rack module 2 includes part of the eight respective support column modules 70 and the floor module 80. FIGS. 12A and 12B are perspective views of the support column module 70, and FIGS. 13A to 13F are respectively a plan view, a right side view, a left side view, a top view, a bottom view, and a back view of the support column module 70. Furthermore, FIG. 14 is a perspective view of the floor module 80. Furthermore, FIG. 13G is an enlarged view of FIG. 13A.

As illustrated in FIGS. 12A, 12B, and 13A to 13F, the support column module 70 is a member having a columnar shape extending in an axial line a1 direction and having rigidity, and includes a main body 71, an insertion plug 72, and an accommodation plug 73. The main body 71 includes, for example, a base part 71a which is a bar-shaped part extending with the axis a1 arranged as the center axis or the substantial center axis, a plurality of rib parts 71b which is plate-like parts extending in the axis a1 direction, and a plurality of rib parts 71c which is plate-like parts extending in a direction perpendicular to the axis a1. The base part 71a, the plurality of rib parts 71b, and the plurality of rib parts 71c are integrally connected to form the support column module 70.

As illustrated in FIGS. 12A and 12B, the insertion plug 72 is connected to one end in the axis a1 direction of the main body 71 at which an insertion part 74 protruding toward one side of the axis a1 direction is formed. The insertion part 74, for example, includes four insertion protrusion parts 74a which are parts protruding in the axis a1 direction. The insertion protrusion parts 74a are arranged at equal intervals with the axis a1 arranged at the center, and for example, the two insertion protrusion parts 74a are respectively aligned in a direction perpendicular to the axis a1 to form two rows of the insertion protrusion parts 74a. These two rows face each other. Note that the number of the insertion protrusion parts 74a provided at the insertion plug 72 is not limited to four, and may be one or other plural numbers. The number of the insertion protrusion parts 74a provided at the insertion plug 72 is determined to match with, for example, the number of accommodation recess parts 75a of the accommodation plug 73 described below.

Figure 13F:
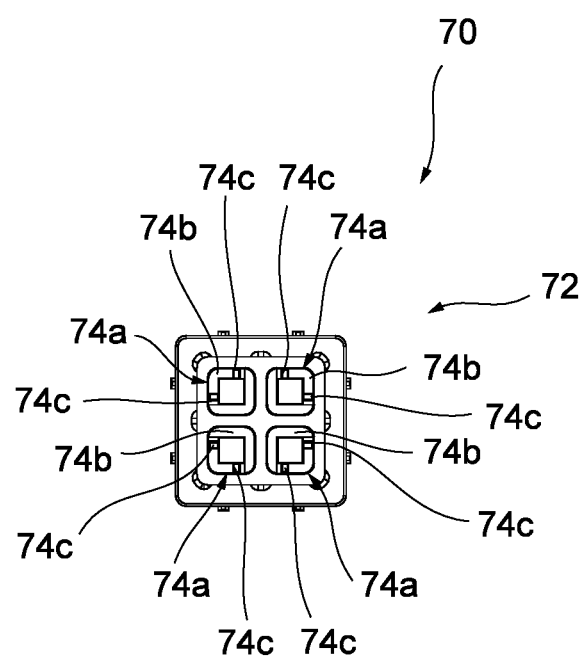
FIG. 13F is a back view of the support column module 70.
Figure 13G:
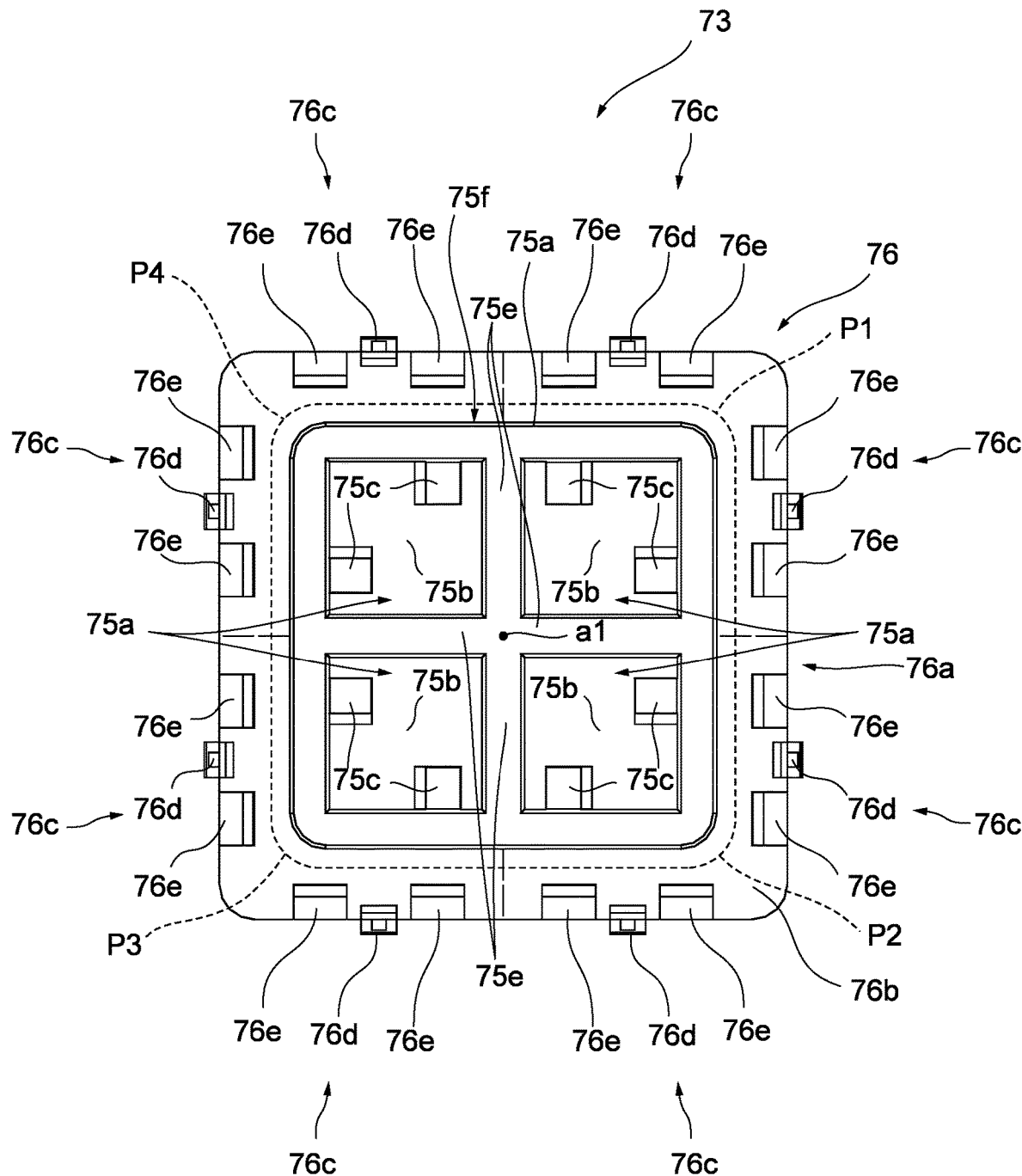
FIG. 13G is an enlarged view of FIG. 13A.
Figure 14:
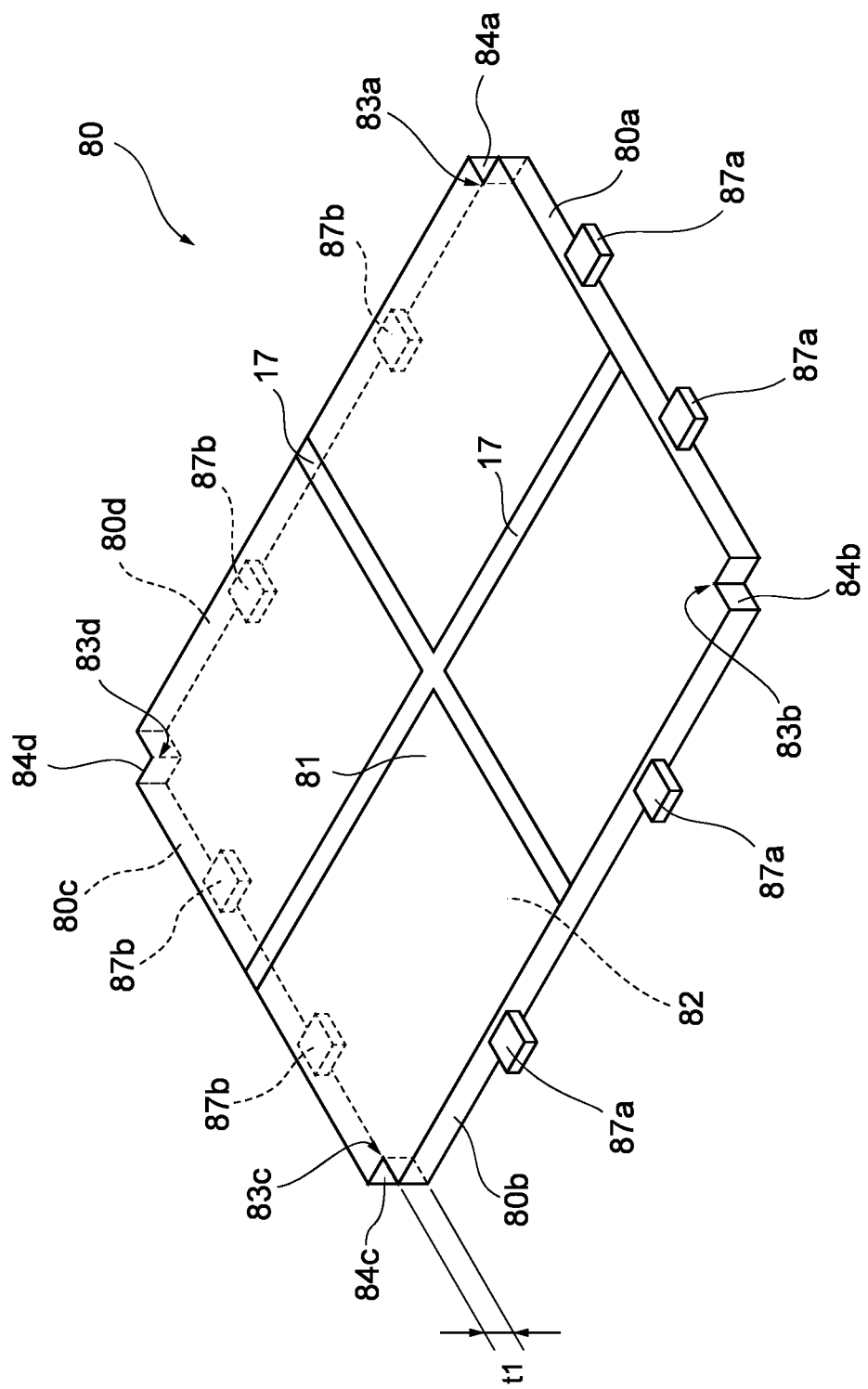
FIG. 14 is a perspective view of a floor module 80 included in the rack modules 2.

As illustrated in FIG. 13F, each insertion protrusion part 74a has, for example, a cylindrical shape extending along the axis a1, and, more specifically, has, for example, a square cylindrical shape whose corner edge is a curved surface having an arc-shaped cross section. Furthermore, claw parts 74c extending along the axis a1 are formed at a distal end 74b of each insertion protrusion part 74a. The claw part 74c has a shape which can engage with a corresponding part, and has, for example, a shape which can engage with a corresponding part by snap-fit. For example, the two claw parts 74c are provided at each insertion protrusion part 74a.

As illustrated in FIGS. 12A and 12B, the accommodation plug 73 is connected to an other end in the axis a1 direction of the main body 71, and the insertion plug 72 and the accommodation plug 73 of the support column module 70 oppose to each other in the axis a1 direction. The accommodation plug 73 includes an accommodation part 75, and the accommodation part 75 can accommodate the insertion part 74 of the insertion plug 72 of the support column module 70. More specifically, the accommodation part 75 includes the four accommodation recess parts 75a which can respectively accommodate the four insertion protrusion parts 74a of the insertion part 74 of the insertion plug 72. As illustrated in FIG. 13A, the accommodation recess part 75a has a shape matching the insertion protrusion part 74a, and is a recess part recessed toward the insertion plug 72 side in the axis a1 direction. Each accommodation recess part 75a can accommodate the corresponding insertion protrusion part 74a. Each accommodation recess part 75a may be able to accommodate the corresponding insertion protrusion part 74a by clearance fit, accommodate the corresponding insertion protrusion part 74a by stationary fit, or accommodate the corresponding insertion protrusion part 74a by transition fit. Note that the number of the accommodation recess parts 75a provided to the accommodation plug 73 is not limited to four, and may be one or other plural numbers. The number of the insertion protrusion parts 74a provided to the insertion plug 72 may be determined according to, for example, the number of the floor modules 80 supported by the support column module 70.

More specifically, the four accommodation recess parts 75a are arranged to meet the four insertion protrusion parts 74a of the insertion part 74, and are arranged at equal intervals with the axis a1 arranged at the center, and the two accommodation recess parts 75a are respectively aligned in a direction perpendicular to the axis a1 to form two rows of the accommodation recess parts 75a facing each other. Furthermore, each accommodation recess part 75 is a recess part defining a bottomed cylindrical surface extending along the axis a1, has a square cross-sectional outline perpendicular to the axis a1 as illustrated in, for example, FIGS. 12A, 13A, and 13G, and can accommodate the corresponding insertion protrusion part 74a by stationary fit. Furthermore, at a bottom part 75b of each accommodation recess part 75a, engagement recess parts 75c extending along the axis a1 are formed. Each engagement recess part 75c can accommodate the claw part 74c of the corresponding insertion protrusion part 74a, and can engage with the accommodated claw part 74c. Each engagement recess part 75c has, for example, a shape which can engage with the corresponding claw part 74c by snap-fit. Each accommodation recess part 75a is provided with, for example, the two engagement recess parts 75c.

Furthermore, as illustrated in, for example, FIGS. 12A, 13A, and 13G, the accommodation plug 73 is formed with a floor reception part 76 formed around the accommodation part 75. The floor reception part 76 is a part to support the floor module 80 in the axis a1 direction. The floor reception part 76 includes a flange part 76a forming a face (floor reception face 76b) extending along a plane perpendicular to the axis a1, and engagement protrusion parts 76c protruding from the flange part 76a to a side opposite to the main body 71 in the axis a1 direction. As illustrated in, for example, FIG. 13G, the floor reception face 76b extends in parallel to the plane perpendicular to the axis a1. The engagement protrusion part 76c has a shape which can engage with a corresponding part, and includes, for example, a claw part 76d having a shape which can engage with a corresponding part by snap-fit, and pins 76e which can be accommodated in corresponding parts. The floor reception part 76 is provided with, for example, the plurality of claw parts 76d, and is provided with the plurality of pins 76e.

The accommodation part 75 protrudes from the flange part 76a of the floor reception part 76 toward a side opposite to the main body 71 in the axis a1 direction. A height h1 (see FIGS. 13B to 13E) of the accommodation part 75 is a thickness t1 (see FIG. 14) of the floor module 80 or more. Note that the height h1 of the accommodation part 75 is a distance in the axis a1 direction between the floor reception face 76b of the flange part 76a and a distal end face 75d of the accommodation part 75. Note that the height h1 of the accommodation part 75 may be smaller than the thickness t1 of the floor module 80. As illustrated in FIGS. 12A and 13G, the accommodation part 75 includes plate-like inner wall parts 75e, and an outer wall part 75f surrounding these four inner wall parts 75e. These inner wall parts 75e and outer wall part 75f define the four accommodation recess parts 75a. The inner wall part 75e is, for example, a plate-like part extending in the direction perpendicular to the axis a1, and the outer wall part 75*f* is, for example, an annular cylindrical part around the axis a1. An outer circumferential surface 75*g* of the outer wall part 75*f* is a cylindrical surface, and has, for example, a square or substantial square outline in plan view as illustrated in FIG. 13G. Note that the shape of the outer circumferential surface 75*g* of the outer wall part 75*f* is not limited to a shape having the square outline in plan view, and may have a shape having an outline of another shape in plan view. For example, the shape of the outer circumferential surface 75*g* of the outer wall part 75*f* may be other polygons or circles in plan view, or may be a shape substantially having an outline of these shapes.

The main body 71, the insertion plug 72, and the accommodation plug 73 are parts of the support column module 70 which are integrally formed by the same material, and the main body 71, the insertion plug 72, and the accommodation plug 73 are integrally formed. A material of the support column module 70 is, for example, a resin. The material of the support column module 70 is not limited to the resin, and may be, for example, metal.

The support column module 70 employs the above-described configuration, and the two support column modules 70 are coupled to each other by accommodating and connecting the insertion plug 72 of the one support column module 70 in and to the accommodation plug 73 of the other support column module 70. Furthermore, at a time of this coupling, the claw parts 74*c* of each insertion protrusion part 74*a* of the insertion plug 72 of the one support column module 70 are accommodated in the corresponding engagement recess parts 75*c* of the corresponding accommodation recess part 75*a* of the accommodation plug 73 of the other support column module 70, and these claw parts 74*c* and engagement recess parts 75*c* are engaged by snap-fit. On the other hand, the two support column modules 70 coupled as described above are detached by pulling the insertion plug 72 of the one support column module 70 from the accommodation plug 73 of the other support column module 70.

The plurality of support column modules 70 are coupled in this way, so that the one support column 12 can be formed. When the support column modules 70 are coupled, each insertion protrusion part 74*a* fits to the corresponding accommodation recess part 75*a*, and the claw parts 74*c* and the engagement recess parts 75*c* engage with each other. Consequently, it is possible to increase coupling strength between these support column modules 70, and increase strength of the support column 12. On the other hand, as described above, it is possible to decouple the support column modules 70 of the support column 12.

The floor module 80 is a plate-like member corresponding to the one section 13 of the floor 11, and includes a surface 81 which is a face on which the section 13 is formed. The floor module 80 includes a plurality of corner portions. As described above, the section 13 defines, for example, the square or rectangular outline in plan view, and, similarly, as illustrated in FIG. 14, the floor module 80 defines, for example, a square or rectangular outline in plan view, and includes four corner portions 83*a* to 83*d*. The thickness t1 of the floor module 80 is a distance between the surface 81 and a back surface 82 which is a face opposing to the surface 81. The corner parts of the floor module 80 can be supported by the accommodation plugs 73 of the support column modules 70. For example, the floor module 80 has a structure in which the floor modules 80 the number of which is the same as the number of the corner portions included in the floor module 80 can be supported by the accommodation part 75 and the floor reception part 76 of the one accommodation plug 73. Note that the floor module 80 may have a structure in which the floor modules 80 the number of which is different from the number of corner portions included in the floor module 80 can be supported by the accommodation part 75 and the floor reception part 76 of the one accommodation plug 73.

Respectively at the four corner portions 83*a* to 83*d* of the floor module 80, cutout faces 84*a* to 84*d* are formed. Note that the corner portions 83*a* to 83*d* are aligned clockwise in order in plan view. The cutout faces 84*a* to 84*d* are each a part defining, at each of the corner portions 83*a* to 83*d*, a space recessed in an extension direction of the floor module 80, and is a face facing this space. The cutout faces 84*a* to 84*d* are each a face corresponding to part of the outer circumferential surface 75*g* of the outer wall part 75*f* of the accommodation part 75 of the support column module 70. For example, the cutout faces 84*a* to 84*d* are each a face which can come into contact with part of the outer circumferential surface 75*g* of the outer wall part 75*f* of the accommodation part 75, or a face facing a fixed or substantially fixed interval apart from each other.

More specifically, for example, the cutout face 84*a* is a face corresponding to a ¼ or substantially ¼ part of the outer circumferential surface 75*g* of the outer wall part 75*f* around the axis a1. The cutout face 84*b* is a face corresponding to another ¼ or substantially ¼ part of the outer circumferential surface 75*g* of the outer wall part 75*f* around the axis a1. The cutout face 84*c* is a face corresponding to another ¼ or substantially ¼ part of the outer circumferential surface 75*g* of the outer wall part 75*f* around the axis a1. The cutout face 84*d* is a face corresponding to another ¼ or substantially ¼ part of the outer circumferential surface 75*g* of the outer wall part 75*f* around the axis a1. Note that the ¼ part of the outer circumferential surface 75*g* of the outer wall part 75*f* which each of the cutout faces 84*a* to 84*d* faces is aligned clockwise in order around the axis a1. Hence, when the four floor modules 80 are annularly aligned facing the same direction such that the surfaces 81 are coplanar, the cutout faces 84*a* to 84*d* of the four respective floor modules 80 form through-holes surrounding outer circumferential surfaces 75*g* of the accommodation parts 75. That is, the cutout face 84*a* of the one floor module 80, the cutout face 84*b* of the one floor module 80, the cutout face 84*c* of the one floor module 80, and the cutout face 84*d* of the one floor module 80 are annularly aligned in this order. Note that one cutout face may not be the face corresponding to the ¼ or substantially ¼ part of the outer circumferential surface 75*g* of the outer wall part 75*f* around the axis a1, and may be a face corresponding to a part of another size of the outer circumferential surface 75*g*. According to, for example, the number of the corner portions of the floor module 80, the number of the floor modules 80 supported by the one accommodation plug 73, or the like, the one cutout face may be a face corresponding to a part of a predetermined size of the outer circumferential surface 75*g*.

The ¼ or substantially ¼ part of the outer circumferential surface 75*g* of the outer wall part 75*f* around the axis a1 which the cutout faces 84*a* to 84*d* face is a part of the outer circumferential surface 75*g* of the outer wall part 75*f* facing the one accommodation recess part 75*a*. More specifically, as illustrated in FIG. 13G, the part of the outer circumferential surface 75*g* which the cutout face 84*a* faces is a part of the outer circumferential surface 75*g* facing the one accommodation recess part 75*a* along a dotted line p1. Furthermore, the part of the outer circumferential surface 75*g* which the cutout face 84*b* faces is a part of the outer circumferential surface 75*g* facing the one accommodation recess part 75*a* along a dotted line p2. Furthermore, the part of the outer circumferential surface 75g which the cutout face 84c faces is a part of the outer circumferential surface 75g facing the one accommodation recess part 75a along a dotted line p3. Furthermore, the part of the outer circumferential surface 75g which the cutout face 84d faces is a part of the outer circumferential surface 75g facing the one accommodation recess part 75a along a dotted line p4.

Figure 15:
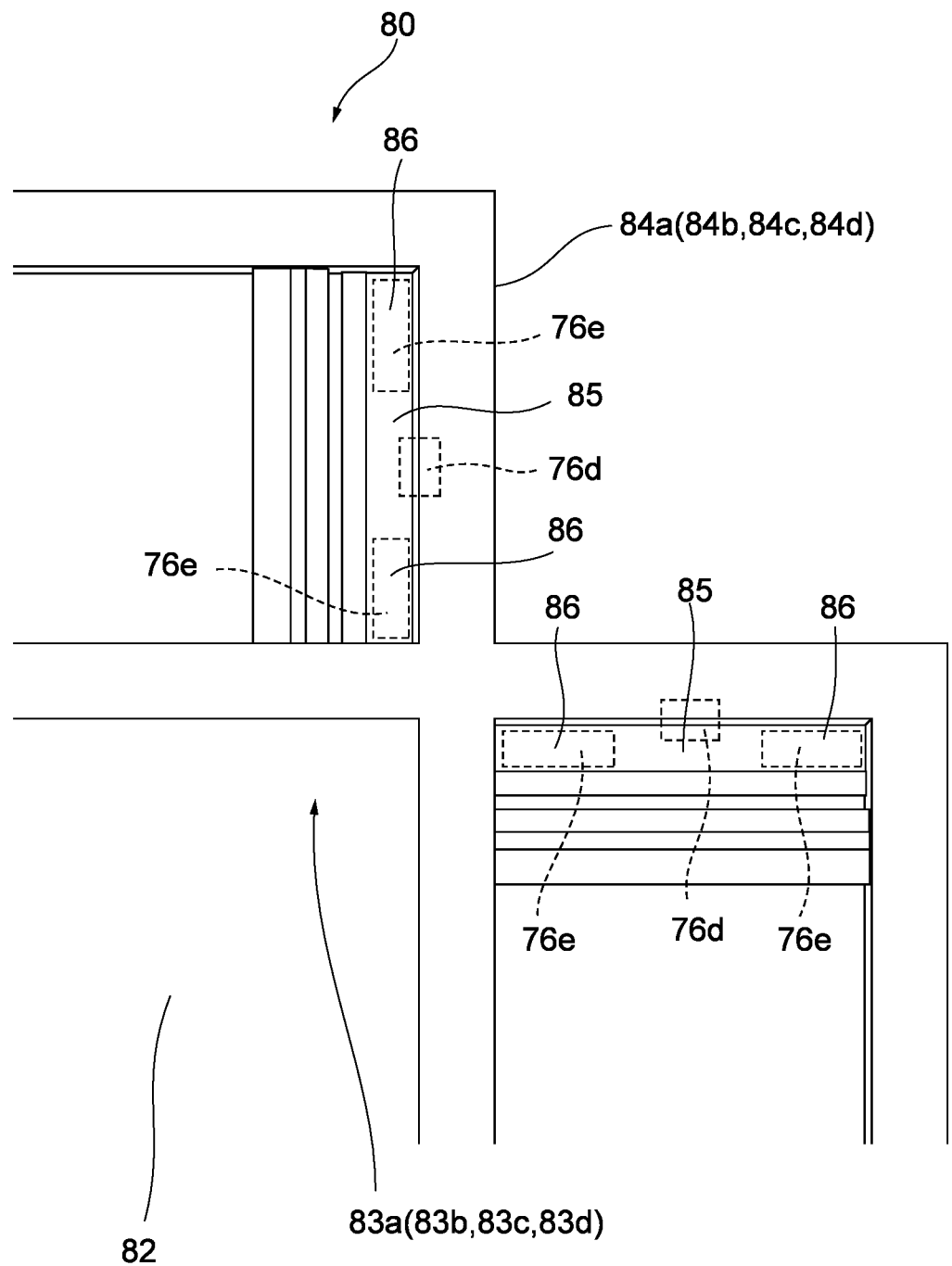
FIG. 15 is a view illustrating an enlarged vicinity of a corner 83 of the floor module 80.

Furthermore, as illustrated in FIG. 15, near the four cutout faces 84a to 84d of the floor module 80, an engagement recess part 85 and recess parts 86 which can respectively accommodate the claw part 76d and the pins 76e of the engagement protrusion part 76c provided to the floor reception part 76 of the support column module 70 are formed. The engagement recess part 85 can engage with the accommodated claw part 76d by snap-fit. The pin 76e is accommodated in the recess part 86 to position the floor module 80 with respect to the support column module 70. In a state where the cutout faces 84a, 84b, 84c, or 84d faces the corresponding part p1, p2, p3, or p4 of the outer circumferential surface 75g of the outer wall part 75f of the accommodation part 75 in desired forms, the claw part 76d and the pins 76e may be respectively accommodated in the corresponding engagement recess part 85 and the recess parts 86. Note that, although the engagement recess part 85 and the recess parts 86 continue in the illustrated example, the forms of the engagement recess part 85 and the recess parts 86 are not limited to these.

Furthermore, as illustrated in FIG. 14, the floor module 80 includes a coupling part 87 for coupling to the other floor modules 80. The coupling part 87 includes, for example, the engagement protrusion parts 87a provided on one side surfaces of respective surfaces (side surfaces 80a and 80c and side surfaces 80b and 80d) of a pair of two opposing side surfaces of the floor module 80, and the engagement recess parts 87b provided on other side surfaces of respective surfaces (the side surfaces 80a and 80c and the side surfaces 80b and 80d) of a pair of two opposing side surfaces. The engagement protrusion part 87a is a protrusion protruding from the side surface, and the engagement recess part 87b is a recess part recessed from the side surface. When the floor module 80 is aligned at a desired position adjacent to the other floor module 80, the engagement protrusion part 87a is accommodated in the corresponding engagement recess part 87b. In the illustrated example, the side surface 80a and the side surface 80b of the floor module 80 are provided with the engagement protrusion parts 87a, and the side surface 80c and the side surface 80d of the floor module 80 are provided with the engagement recess parts 87b. Furthermore, although the two engagement protrusion parts 87a or the two engagement recess parts 87b are provided on one side surface, the numbers of the engagement protrusion parts 87a and the engagement recess parts 87b are not limited to these.

Furthermore, on the surface 81 of the floor module 80, the two lines 17 intersecting at a center or a substantial center of the surface 81 is provided. For example, the two lines 17 are perpendicular or substantially perpendicular to each other. As described above, the transportation robot 30 can run along the lines 17 or stop on the line 17 by tracing these lines 17.

Note that, although the floor module 80 is the plate-like member, the floor module 80 may be solid or have a cavity inside. For example, the floor module 80 may be formed by stretching a plate-like surface member on a surface of a framework assembled in a grid pattern. Furthermore, the number of the corner portions 83 of the floor module 80 is not limited to four, and the shape of the floor module 80 in plan view is not limited to the square or the rectangle, and may be other shapes such as other polygons and circles.

Figure 16:
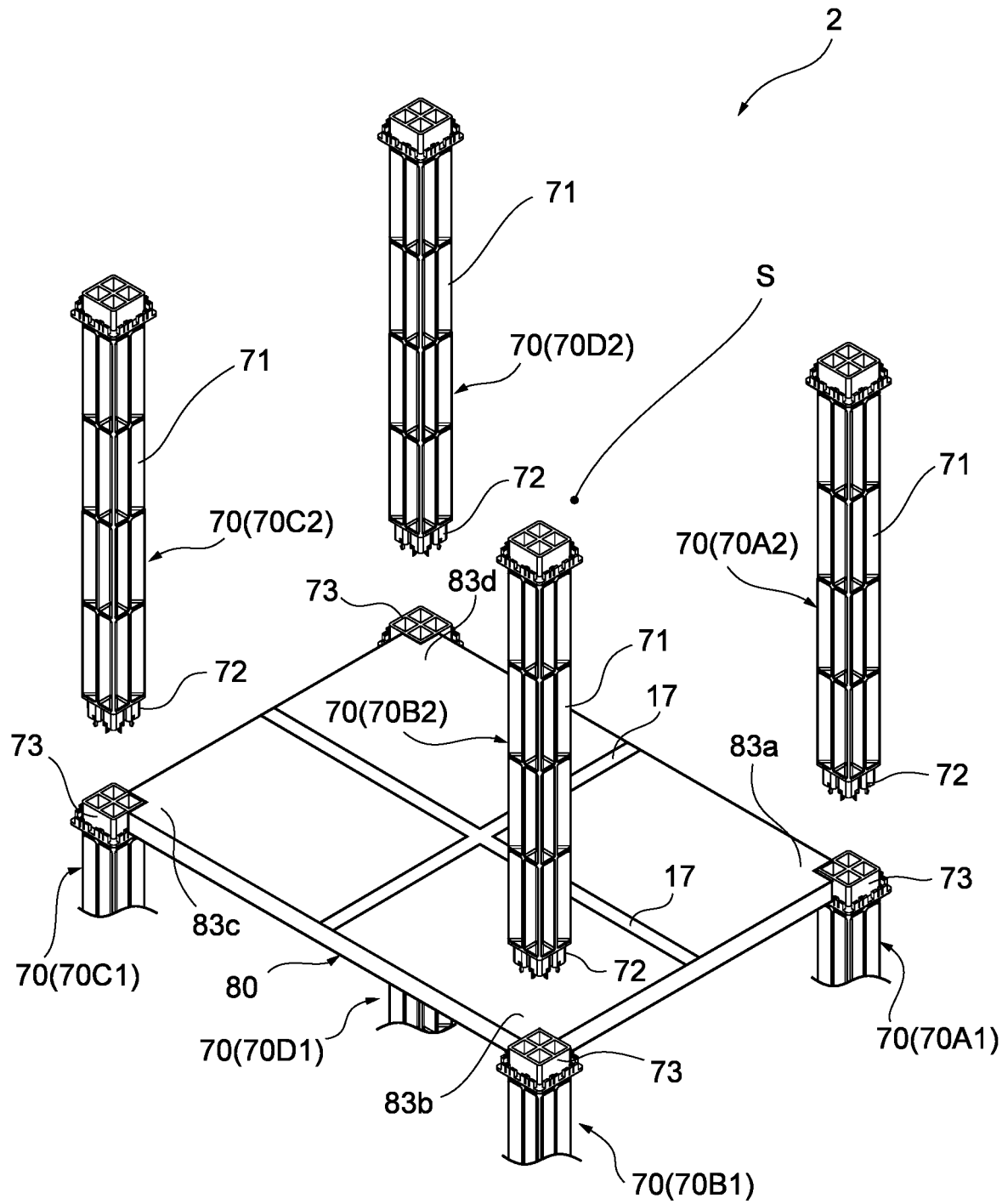
FIG. 16 is a partial exploded perspective view of the rack module 2.
Figure 17:
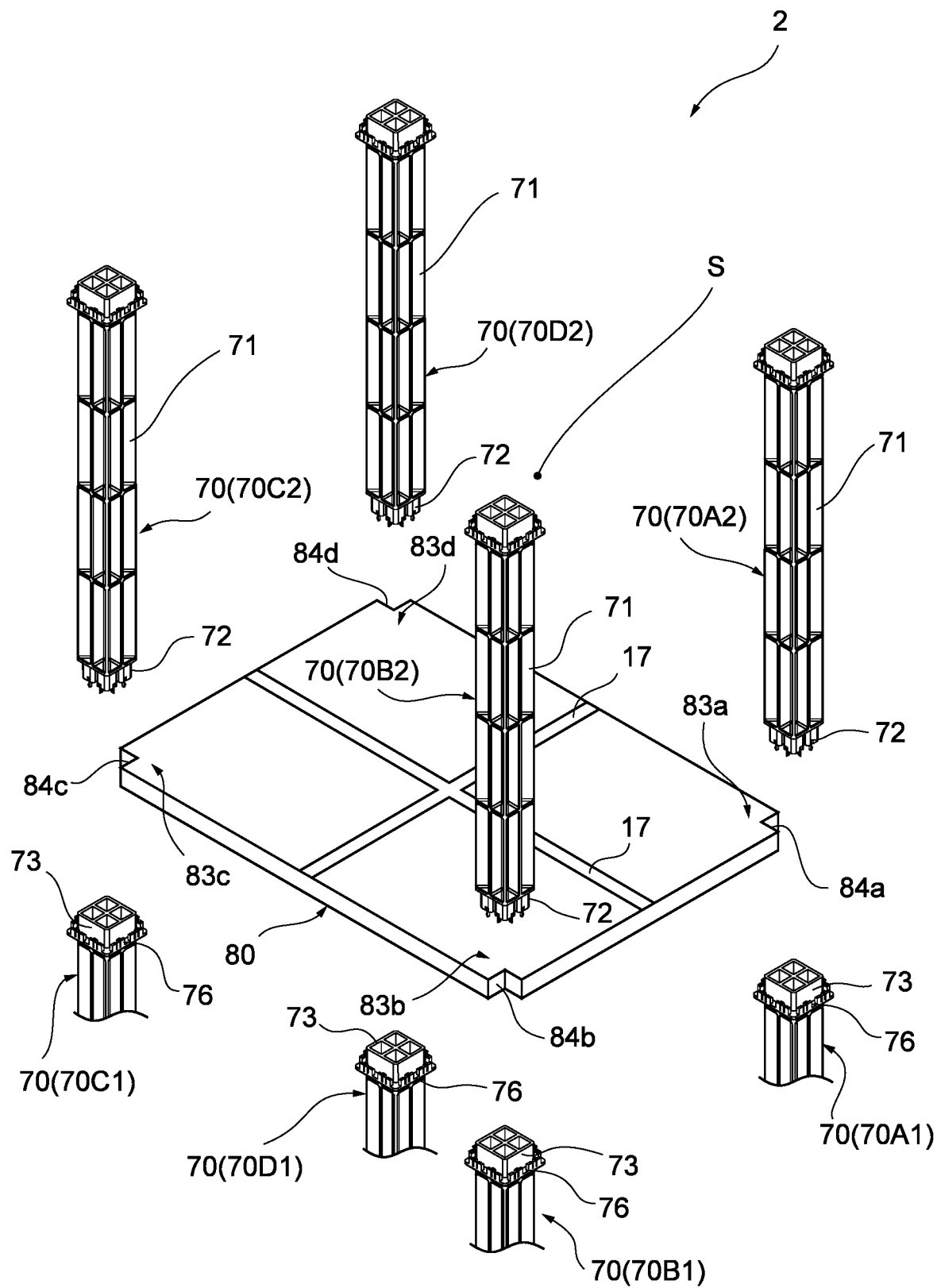
FIG. 17 is an exploded perspective view of the rack module 2.

As illustrated in FIGS. 11, 16, and 17, the rack module 2 includes the respective accommodation plugs 73 of the four support column modules 70 meeting the four corner portions 83a to 83d of the floor module 80, the respective main bodies 71 and insertion plugs 72 of the other four support column modules 70 respectively coupled to the accommodation plugs 73 of these four support column modules 70, and the one floor module 80. Note that FIGS. 16 and 17 are exploded perspective views of the rack module 2, FIG. 16 illustrates that the four support column modules 70 and the other four support column modules 70 are detached, and FIG. 17 further illustrates that the respective accommodation plugs 73 of the four support column modules 70 are detached from the floor module 80. In the rack module 2, the respective accommodation plugs 73 of the four support column modules 70 are perpendicular or substantially perpendicular to the surface 81 of the floor module 80, and respectively support the floor module 80 at the four corner portions 83a to 83d.

More specifically, as illustrated in FIGS. 11, 16, and 17, in the rack module 2, the accommodation plug 73 of the one support column module 70A1 among the four support column modules 70 supports the floor module 80 at the corner portion 83a of the floor module 80. More specifically, the corner portion 83a of the floor module 80 comes into contact with part of the floor reception face 76b (see FIG. 13G) of the floor reception part 76 of the accommodation plug 73, and the floor module 80 is supported by the support column module 70A1 at the corner portion 83a. Part of the floor reception face 76b coming into contact with the corner portion 83a of the floor module 80 is a part of the floor reception face 76b (along the dotted line p1 in FIG. 13G) facing the one accommodation recess part 75a of the accommodation plug 73. Furthermore, the part (see FIG. 13G) along the dotted line p1 of the outer circumferential surface 75g of the outer wall part 75f faces the cutout face 84a of the corner portion 83a of the floor module 80. Furthermore, the pin 76e near the part along the dotted line p1 of the outer circumferential surface 75g of the accommodation recess part 75a is accommodated in the recess part 86 of the corner portion 83a, and the support column module 70A1 is positioned with respect to the floor module 80. Furthermore, the claw part 76d near the part along the dotted line p1 of the outer circumferential surface 75g is accommodated in and engaged with the engagement recess part 85 of the corner portion 83a by snap-fit, and the support column module 70A1 is fixed to the floor module 80. Furthermore, the insertion plug 72 of one support column module 70A2 among the four other support column modules 70 is inserted in the accommodation plug 73 of the support column module 70A1, and the support column module 70A2 is coupled to the support column module 70A1. In this state, the claw parts 74c of the insertion protrusion part 74a of the insertion plug 72 of the support column module 70A2 are engaged with the engagement recess parts 75c of the accommodation recess part 75a of the accommodation plug 73 of the support column module 70A1 by snap-fit.

Similarly, as illustrated in FIGS. 11, 16, and 17, in the rack module 2, the accommodation plug 73 of the one support column module 70B1 among the four support column modules 70 supports the floor module 80 at the corner portion 83b of the floor module 80. More specifically, the corner portion 83b of the floor module 80 comes into contact with part of the floor reception face 76b (see FIG. 13G) of the floor reception part 76 of the accommodation plug 73, and the floor module 80 is supported by the support column module 70B1 at the corner portion 83*b*. Part of the floor reception face 76*b* coming into contact with the corner portion 83*b* of the floor module 80 is a part of the floor reception face 76*b* (along the dotted line p2 in FIG. 13G) facing the one accommodation recess part 75*a* of the accommodation plug 73.

Furthermore, the part (see FIG. 13G) along the dotted line p2 of the outer circumferential surface 75*g* of the outer wall part 75*f* faces the cutout face 84*b* of the corner portion 83*b* of the floor module 80. Furthermore, the pin 76*e* near the part along the dotted line p2 of the outer circumferential surface 75*g* of the accommodation recess part 75*a* is accommodated in the recess part 86 of the corner portion 83*b*, and the support column module 70B1 is positioned with respect to the floor module 80. Furthermore, the claw part 76*d* near the part along the dotted line p2 of the outer circumferential surface 75*g* is accommodated in and engaged with the engagement recess part 85 of the corner portion 83*b* by snap-fit, and the support column module 70B1 is fixed to the floor module 80. Furthermore, the insertion plug 72 of the one support column module 70B2 among the four other support column modules 70 is inserted in the accommodation plug 73 of the support column module 70B1, and the support column module 70B2 is coupled to the support column module 70B1. In this state, the claw parts 74*c* of the insertion protrusion part 74*a* of the insertion plug 72 of the support column module 70B2 are engaged with the engagement recess parts 75*c* of the accommodation recess part 75*a* of the accommodation plug 73 of the support column module 70B1 by snap-fit.

Similarly, as illustrated in FIGS. 11, 16, and 17, in the rack module 2, the accommodation plug 73 of the one support column module 70C1 among the four support column modules 70 supports the floor module 80 at the corner portion 83*c* of the floor module 80. More specifically, the corner portion 83*c* of the floor module 80 comes into contact with part of the floor reception face 76*b* (see FIG. 13G) of the floor reception part 76 of the accommodation plug 73, and the floor module 80 is supported by the support column module 70C1 at the corner portion 83*c*. Part of the floor reception face 76*b* coming into contact with the corner portion 83*c* of the floor module 80 is a part of the floor reception face 76*b* (along the dotted line p3 in FIG. 13G) facing the one accommodation recess part 75*a* of the accommodation plug 73. Furthermore, the part (see FIG. 13G) along the dotted line p3 of the outer circumferential surface 75*g* of the outer wall part 75*f* faces the cutout face 84*c* of the corner portion 83*c* of the floor module 80. Furthermore, the pin 76*e* near the part along the dotted line p3 of the outer circumferential surface 75*g* of the accommodation recess part 75*a* is accommodated in the recess part 86 of the corner portion 83*b*, and the support column module 70C1 is positioned with respect to the floor module 80. Furthermore, the claw part 76*d* near the part along the dotted line p3 of the outer circumferential surface 75*g* is accommodated in and engaged with the engagement recess part 85 of the corner portion 83*c* by snap-fit, and the support column module 70C1 is fixed to the floor module 80. Furthermore, the insertion plug 72 of the one support column module 70C2 among the four other support column modules 70 is inserted in the accommodation plug 73 of the support column module 70C1, and the support column module 70C2 is coupled to the support column module 70C1. In this state, the claw parts 74*c* of the insertion protrusion part 74*a* of the insertion plug 72 of the support column module 70C2 are engaged with the engagement recess parts 75*c* of the accommodation recess part 75*a* of the accommodation plug 73 of the support column module 70C1 by snap-fit.

Similarly, as illustrated in FIGS. 11, 16, and 17, in the rack module 2, the accommodation plug 73 of the one support column module 70D1 among the four support column modules 70 supports the floor module 80 at the corner portion 83*d* of the floor module 80. More specifically, the corner portion 83*d* of the floor module 80 comes into contact with part of the floor reception face 76*b* (see FIG. 13G) of the floor reception part 76 of the accommodation plug 73, and the floor module 80 is supported by the support column module 70D1 at the corner portion 83*d*. Part of the floor reception face 76*b* coming into contact with the corner portion 83*d* of the floor module 80 is a part of the floor reception face 76*b* (along the dotted line p4 in FIG. 13G) facing the one accommodation recess part 75*a* of the accommodation plug 73. Furthermore, the part (see FIG. 13G) along the dotted line p4 of the outer circumferential surface 75*g* of the outer wall part 75*f* faces the cutout face 84*d* of the corner portion 83*d* of the floor module 80. Furthermore, the pin 76*e* near the part along the dotted line p4 of the outer circumferential surface 75*g* of the accommodation recess part 75*a* is accommodated in the recess part 86 of the corner portion 83*d*, and the support column module 70D1 is positioned with respect to the floor module 80. Furthermore, the claw part 76*d* near the part along the dotted line p4 of the outer circumferential surface 75*g* is accommodated in and engaged with the engagement recess part 85 of the corner portion 83*d* by snap-fit, and the support column module 70D1 is fixed to the floor module 80. Furthermore, the insertion plug 72 of the one support column module 70D2 among the four other support column modules 70 is inserted in the accommodation plug 73 of the support column module 70D1, and the support column module 70D2 is coupled to the support column module 70D1. In this state, the claw parts 74*c* of the insertion protrusion part 74*a* of the insertion plug 72 of the support column module 70D2 are engaged with the engagement recess parts 75*c* of the accommodation recess part 75*a* of the accommodation plug 73 of the support column module 70D1 by snap-fit.

As described above, the rack module 2 includes the floor module 80, the accommodation plugs 73 of the respective support column modules 70A1, 70B1, 70C1, and 70D1 supporting the floor module 80, and the respective main bodies 71 and insertion plugs 72 of the support column modules 70A2, 70B2, 70C2, and 70D2 protruding from the surface 81 of the floor module 80.

Note that the respective main bodies 71 and insertion plugs 72 of the support column modules 70A2, 70B2, 70C2, and 70D2 of the one rack module 2 are components of the rack module 2 adjacent to this rack module 2 in the rack 10. Thus, the respective main bodies 71 and insertion plugs 72 of the support column modules 70A2, 70B2, 70C2, and 70D2 of the one rack module 2 are components shared with the other rack module 2 (see FIGS. 19A and 19B).

Figure 18A:
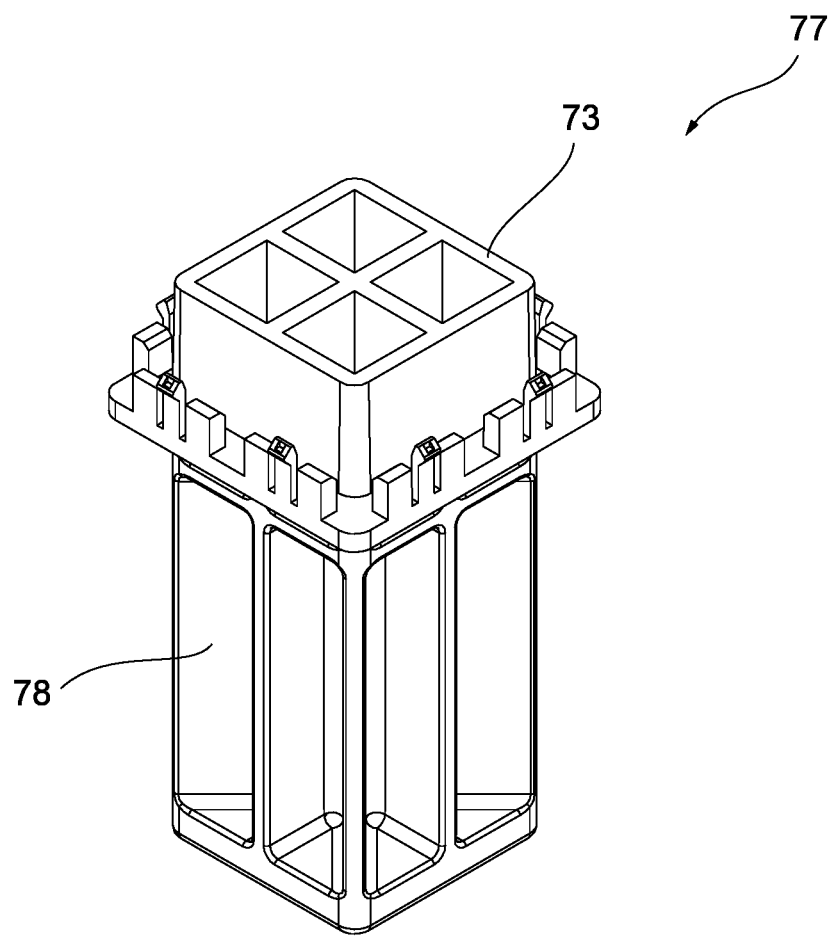
FIGS. 18A and 18B are perspective views of a support column end module 77 included in the rack 10.
Figure 18B:
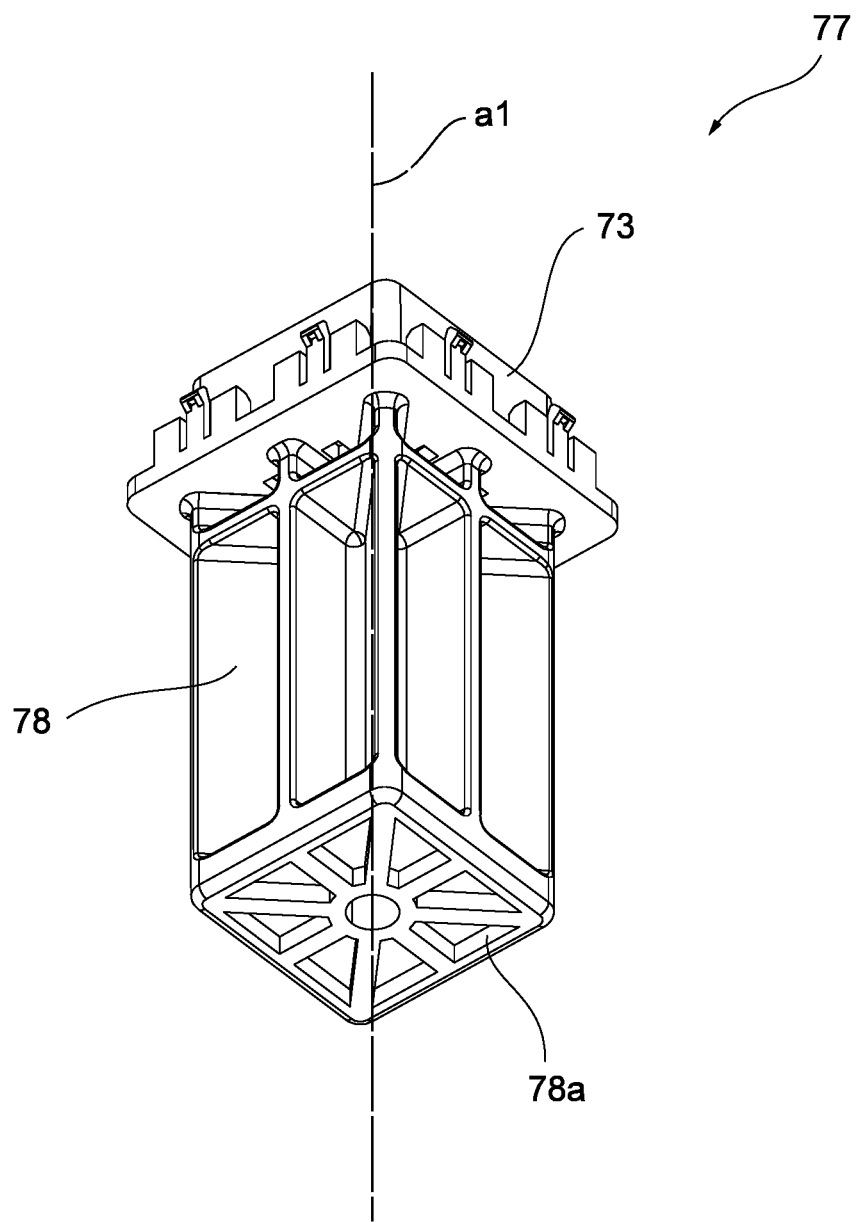
Figure 19A:
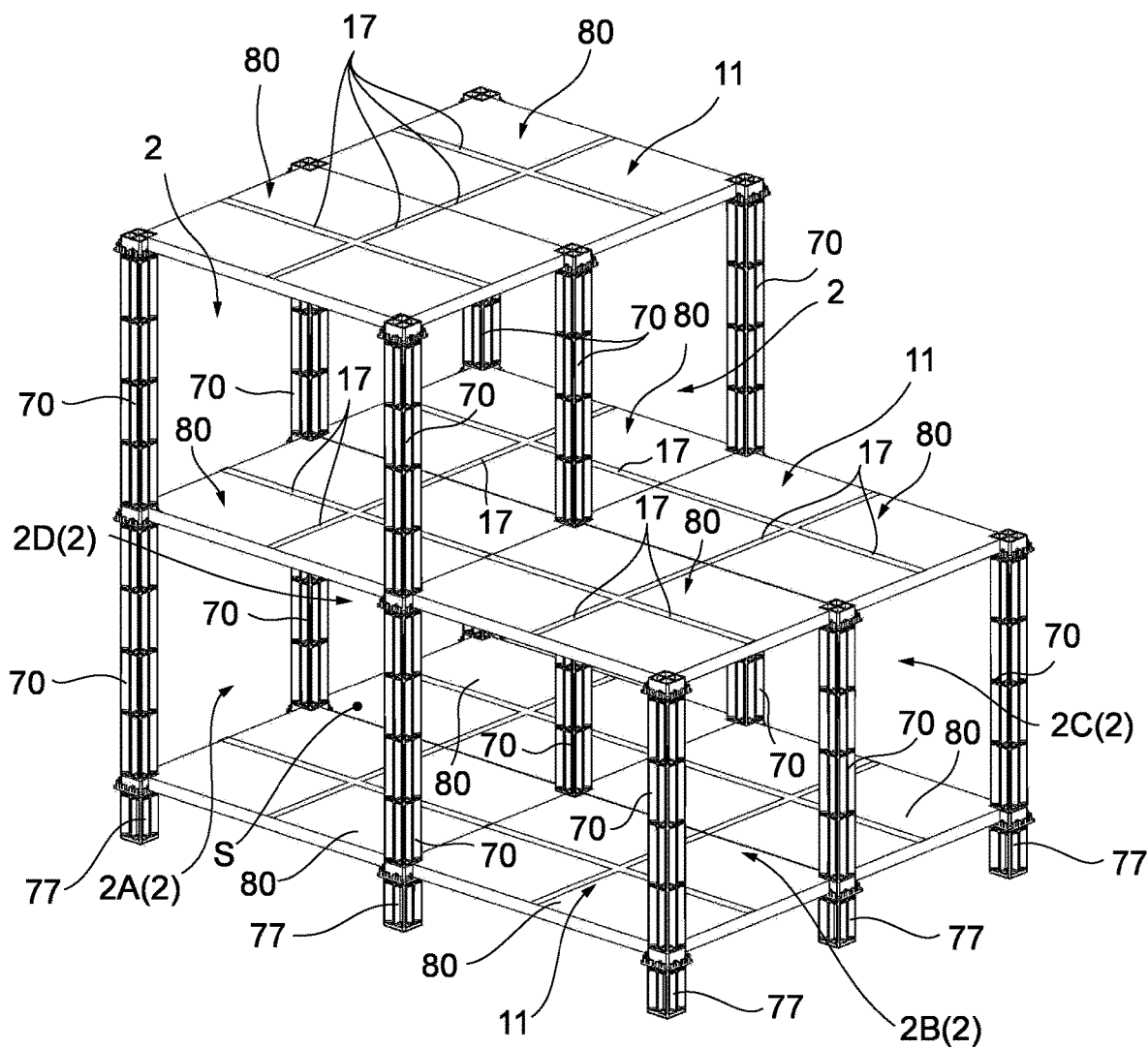
FIGS. 19A and 19B are perspective views illustrating the plurality of rack modules 2 connected in a horizontal direction and a vertical direction.
Figure 19B:
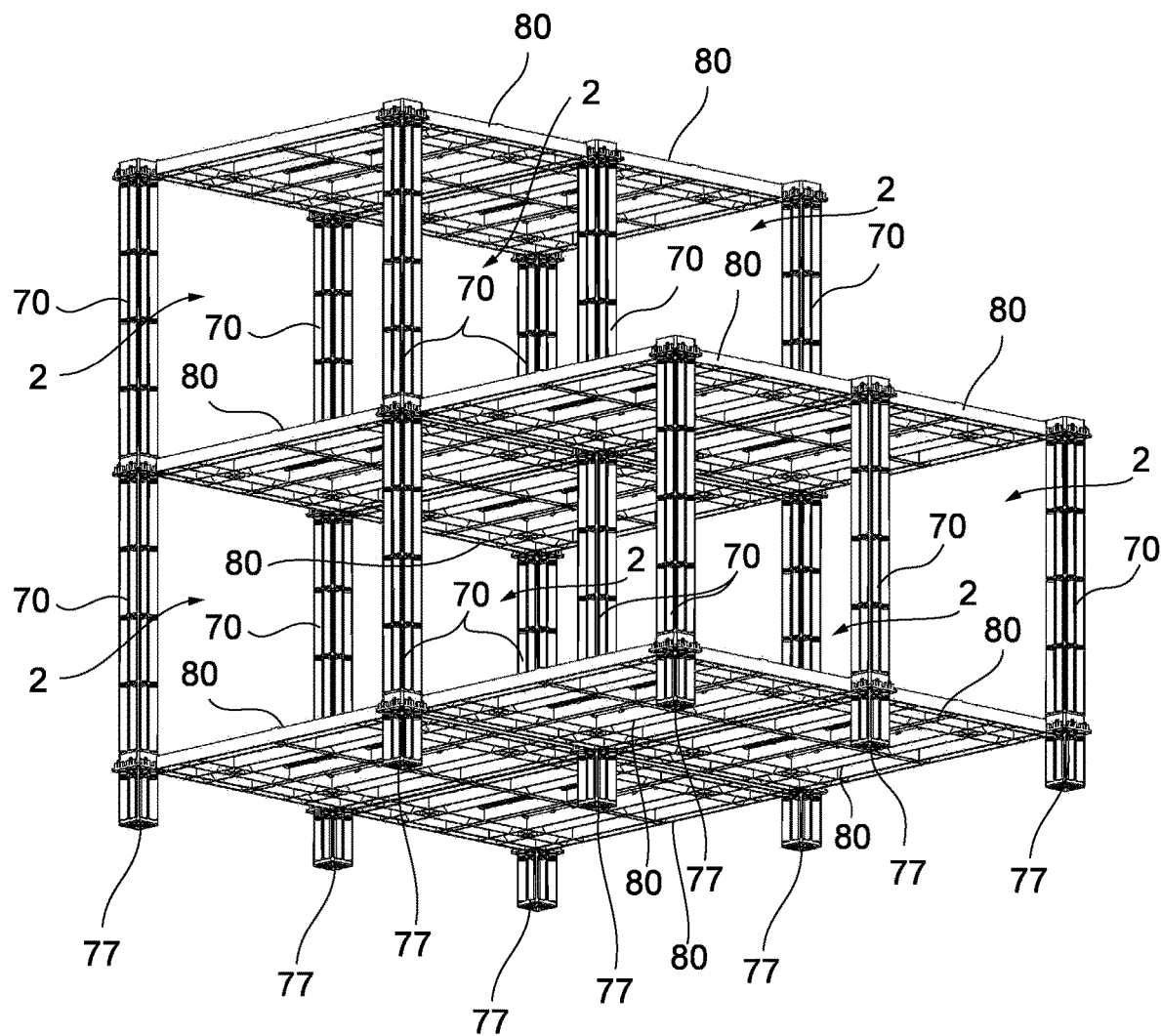

Furthermore, for the rack module 2 making up the lowermost floor 11 in the rack 10, support column end modules 77 illustrated in FIGS. 18A and 18B are used as members supporting the floor module 80 instead of the support column modules 70 (support column modules 70A1, 70B1, 70C1, and 70D1) (see FIGS. 19A and 19B). The support column end module 77 is the same member as part of the accommodation plug 73 side of the support column module 70, and includes the accommodation plug 73 and the main body 78 which is part of the accommodation plug 73 side of the main body 71. An end face 78a of the main body 78 is a face which is perpendicular or substantially perpendicular to the axis a1.

Furthermore, the other floor module 80 is attached to the rack module 2 making up the uppermost floor 11 or the rack module 2 which is the uppermost part in the rack 10 (see FIGS. 19A and 19B). That is, similar to the floor module 80 of the rack module 2, the other floor module 80 is attached to the flange parts 76a of the respective accommodation plugs 73 of the support column modules 70 (support column modules 70A2, 70B2, 70C2, and 70D2) protruding from the surface 81 of the floor module 80.

A plurality of the above-described rack modules 2 is used and assembled arbitrarily to form the rack 10. FIGS. 19A and 19B are perspective views illustrating an example of the plurality of rack modules 2 connected in the horizontal direction and the vertical direction. As illustrated in FIGS. 19A and 19B, the rack modules 2 (a rack module 2A and a rack module 2B, or the rack module 2A and a rack module 2D) adjacent in the horizontal direction (an X direction or a Y direction) share the respective accommodation plugs 73 of the two support column modules 70 supporting the floor module 80, and share the respective main bodies 71 and insertion plugs 72 of the two support column modules 70 protruding from the floor module 80. On the other hand, as illustrated in FIGS. 19A and 19B, the rack modules 2 (the rack module 2A and a rack module 2C) adjacent in the horizontal direction (a direction oblique to the X direction or the Y direction) share the accommodation plug 73 of the one support column module 70 supporting the floor module 80, and share the main body 71 and the insertion plug 72 of the one support column module 70 protruding from the floor module 80.

As described above, the one rack module 2 forms the zone space S corresponding to the one storage bin 20, so that the rack module 2 can make a component unit of the rack 10 smaller. Consequently, it is possible to adopt various forms of the rack 10, and flexibly design the form of the automated storage and retrieval system 1 at various places at which the automated storage and retrieval system 1 is installed. Consequently, it is possible to form the rack 10 in a shape and a size matching a place at which the automated storage and retrieval system 1 is installed, and improve space efficiency of the rack 10. For example, it is possible to connect part of the rack 10 to a space in a basement of a warehouse. Furthermore, it is possible to form the shape of the rack 10 in a complex shape, more efficiently form the movement passages 15 of the transportation robots 30 and the storage areas 14, and improve transportation efficiency and storage efficiency of the item 23. Furthermore, it is possible to more flexibly determine installation positions, shapes, and the like of the transportation elevator 16. More specifically, it is possible to provide the transportation elevators 16 at arbitrary places of the rack 10 including the plurality of floors. Consequently, it is possible to change the lengths, the positions, and the like of the transportation elevators 16 according to, for example, a form of the rack 10, various processing procedures of the automated storage and retrieval system 1, and item liquidity at the automated storage and retrieval system 1. Furthermore, unlike conventional automated storage and retrieval systems, it is possible to install the transportation elevators 16 at an inside of the rack 10, too, which is not surroundings of the rack 10.

Furthermore, each rack module 2 includes the two crossing lines 17 which are minimum component units of the movement passage of the transportation robot 30. Consequently, it is possible to form the movement passages of arbitrary shapes of the transportation robots 30 by arbitrarily connecting the plurality of rack modules 2. Thus, the rack module 2 makes it possible to form the movement passages of the transportation robots 30 in arbitrary shapes, and make the movement passages of the transportation robots 30 complicated.

Furthermore, the rack module 2 can also make up the picking station 40. Consequently, it is possible to more flexibly determine installation positions, shapes, sizes, and the like of the picking stations 40 in the rack 10. The rack module 2 makes it possible to form the movement routes of the transportation robots 30 on each floor 11, and form complicated movement routes. Consequently, it is possible to provide the picking stations 40 on the middle floors 11 in the rack 10. In this case, for example, a robot arm can perform work of picking the item 23 at the picking station 40. Furthermore, for example, it is possible to provide the picking stations 40 near warehouse windows in a small warehouse, and perform work of picking the items 23 through the windows.

Furthermore, it is possible to partially form the rack 10 at a place at which the automated storage and retrieval system 1 is installed, and improve installation efficiency of the rack 10. For example, it is possible to disassemble an existing rack, and partially form the rack 10 in a space left as a result of disassembly. Furthermore, it is possible to easily increase the zone spaces S in the existing rack 10, and easily disassemble the rack 10 and easily change a layout. Consequently, when the automated storage and retrieval system 1 causes a failure, it is possible to partially disassemble the rack 10 by detaching the rack module 2, and easily and efficiently repair the automated storage and retrieval system 1. Furthermore, it is possible to easily and efficiently maintain the automated storage and retrieval system 1.

Thus, the automated storage and retrieval system 1 according to the embodiment of the present disclosure enables flexible design of the form thereof.

Figure 20:
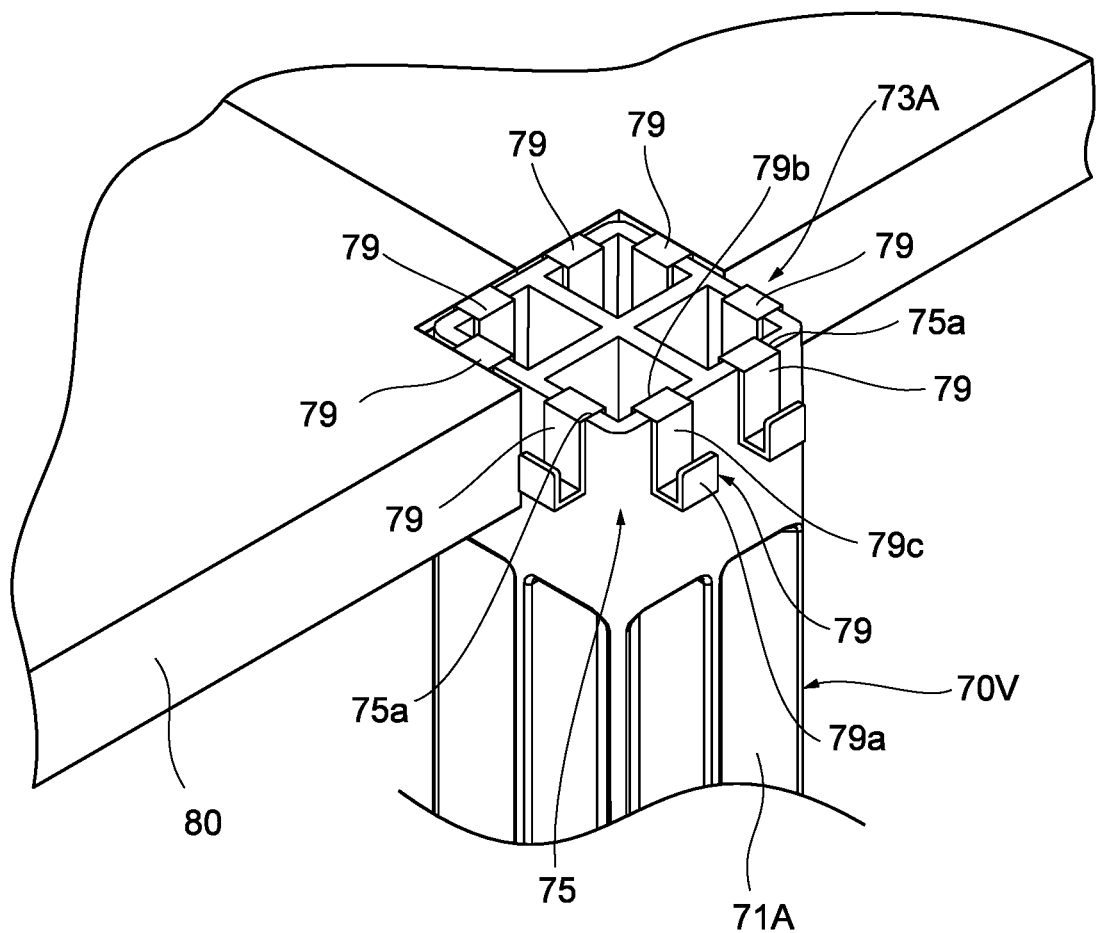
FIG. 20 is a perspective view of a support column module according to a modified example.
Figure 21:
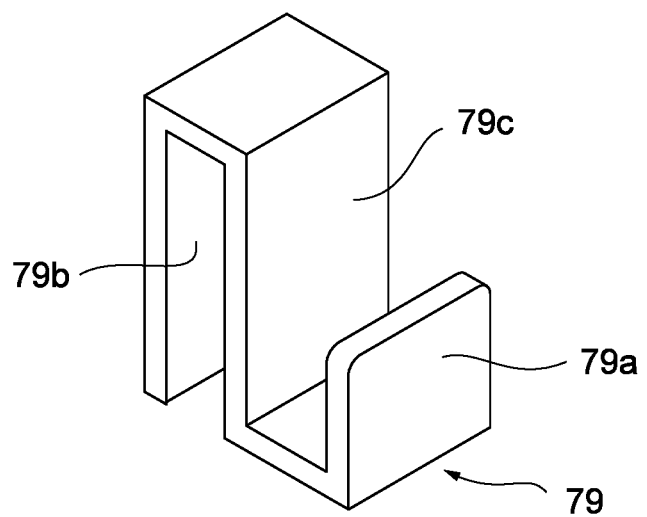
FIG. 21 is a perspective view illustrating an example of a hook included in the support column module according to the modified example.

Note that the support column module 70 may not include the floor reception part 76. FIG. 20 is a perspective view illustrating a support column module 70V according to a modified example of the support column module 70. As illustrated in FIG. 20, the support column module 70V may include hooks 79 fixed to the accommodation part 75 instead of the flange part 76a. FIG. 21 is a perspective view illustrating an example of the hook 79. The hook 79 includes the same functions as those of the floor reception face 76b and the engagement protrusion part 76c of the above-described floor reception part 76. More specifically, for example, the hook 79 includes a floor engagement part 79a as illustrated in FIGS. 20 and 21. The floor engagement part 79a can engage with the floor module 80 from below at each of the corner portions 83a to 83d of the floor module 80, and support the floor module 80. Furthermore, the hook 79 includes a support column engagement part 79b as illustrated in FIGS. 20 and 21. The support column engagement part 79b engages with the accommodation part 75 of the support column module 70V so as to meet each accommodation recess part 75a, and is fixed thereto.

As illustrated in, for example, FIGS. 20 and 21, the floor engagement part 79a of the hook 79 is a part bent from one end of a base part 79c of the hook 79 to an other end side (upper side) and extending upward, and is formed such that the floor engagement part 79a can engage with and be fixed to the engagement recess part 85 (see FIG. 15) of the floor module 80. Furthermore, as illustrated in, for example, FIGS. 20 and 21, the support column engagement part 79b of the hook 79 is a part bent from the other end of the base part 79c of the hook 79 to the one end side (lower side) and extending downward, and is formed such that the support column engagement part 79b can enter the accommodation recess part 75a of the support column module 70V and engage with and be fixed to the outer wall part 75f of the accommodation part 75. Furthermore, as illustrated in FIGS. 20 and 21, for example, the base part 79c of the hook 79 is formed extending along the outer wall part 75f of the accommodation part 75 of the support column module 70.

Furthermore, as illustrated in FIG. 20, for example, the hook 79 can engage with and be fixed to the corresponding outer wall part 75f of each accommodation recess part 75a of the accommodation part 75, i.e., a part of the outer wall part 75f corresponding to each of the dotted lines P1 to P4 (see FIG. 13G). More specifically, the hook 79 is attachable to the two crossing wall parts at the part of the outer wall part 75f corresponding to each of the dotted lines P1 to P4. Furthermore, as illustrated in FIG. 20, a recess part 75h accommodating the support column engagement part 79b and the base part 79c of the hook 79 may be formed on the outer wall part 75f.

Similar to the support column module 70, the support column module 70V can be coupled to the other support column module 70, and can support the floor module 80 at each of the corner portions 83a to 83d. Consequently, the support column module 70V can also make up the rack 10 similar to the support column module 70. Note that the support column end module 77 can also be formed like the above-described support column module 70V. That is, the support column end module 77 may include the hooks 79 instead of the flange part 76a.

The hook 79 functions similar to the floor reception part 76, engages the floor module 80 with the engagement recess part 85 at each of the corner portions 83a to 83d, and supports the floor module 80. Thus, the support column module 70V functions similar to the support column module 70.

Figure 22:
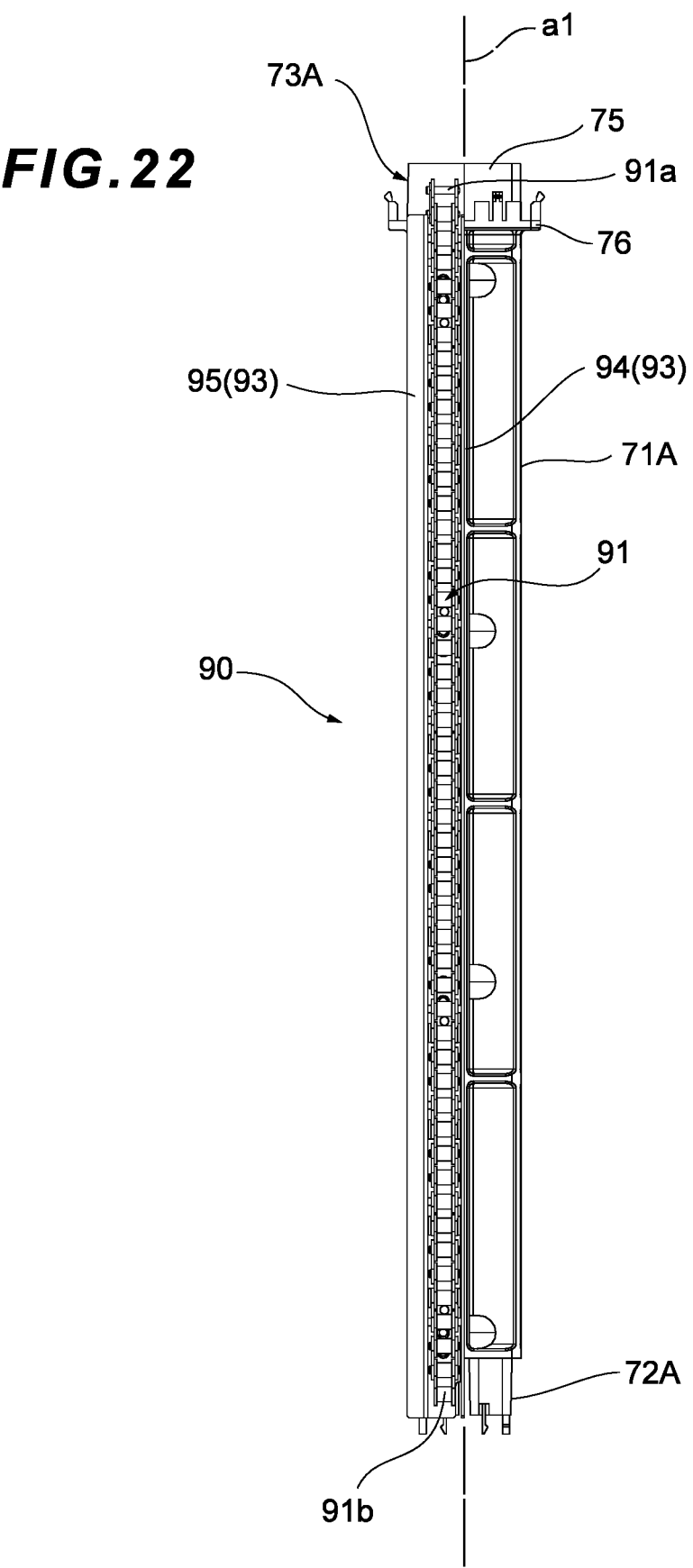
FIG. 22 is a side view of a support column module for forming a passage of a transportation elevator.
Figure 23:
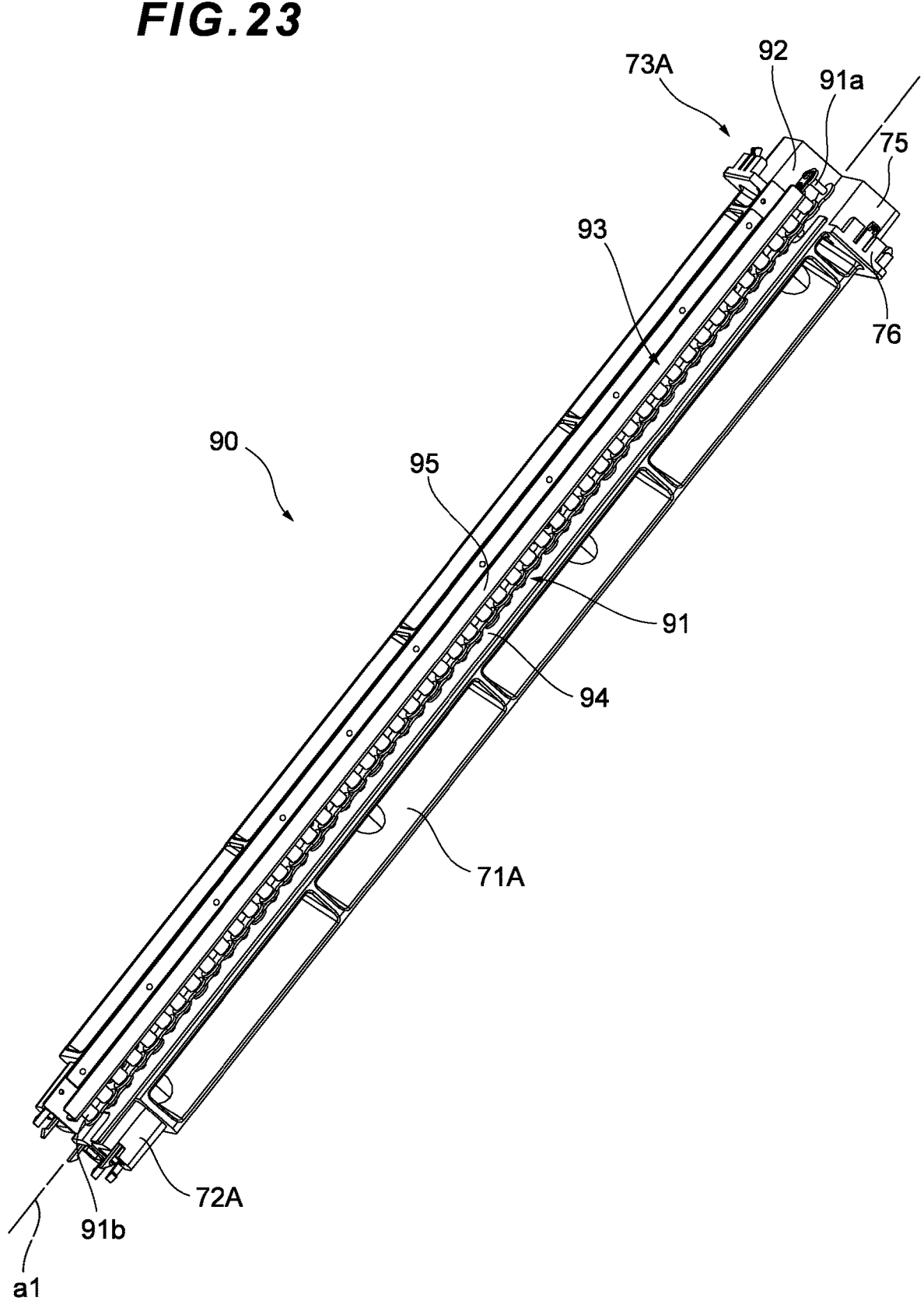
FIG. 23 is a perspective view of the support column module illustrated in FIG. 22.
Figure 24:
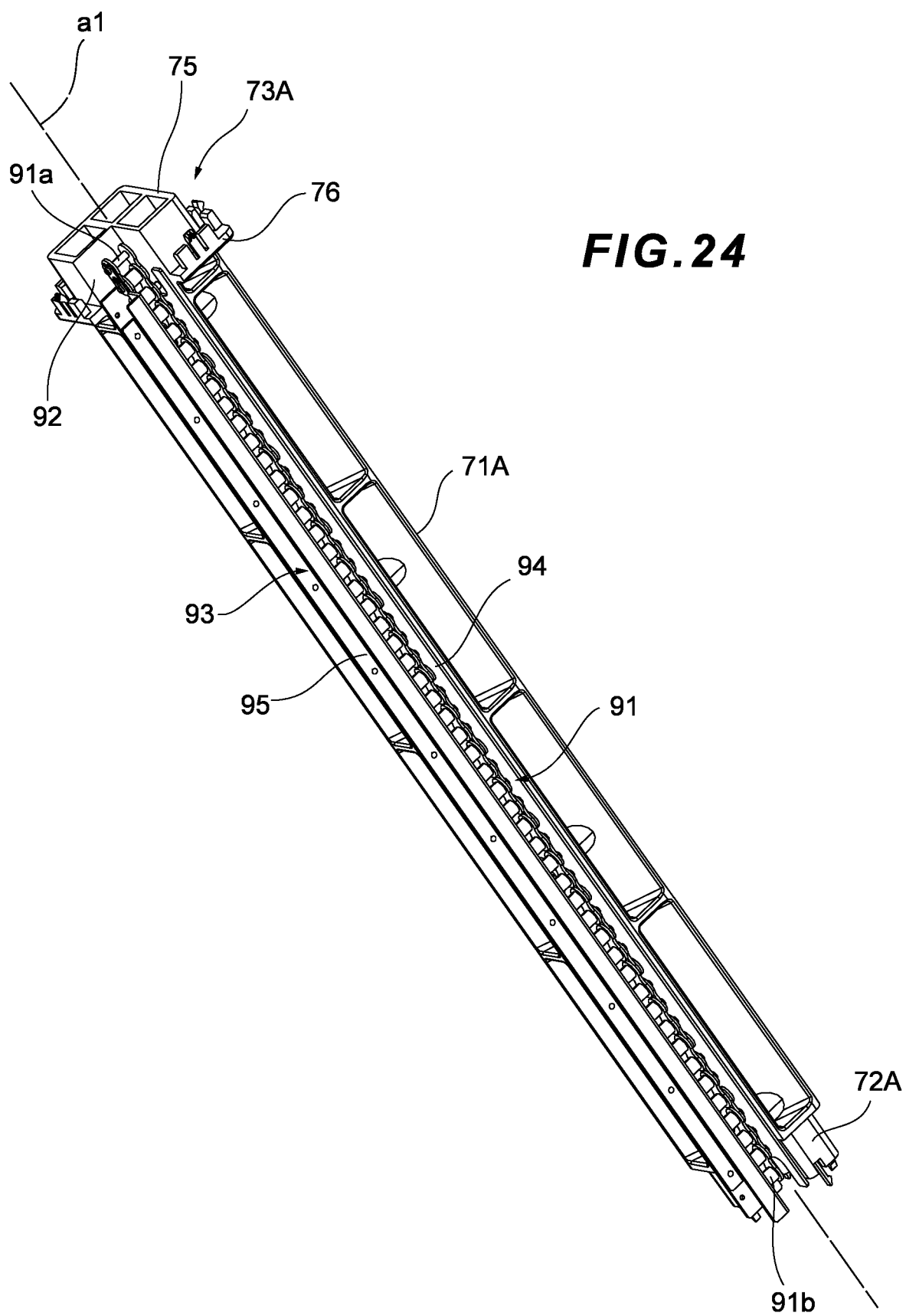
FIG. 24 is a perspective view of the support column module illustrated in FIG. 22.
Figure 25:
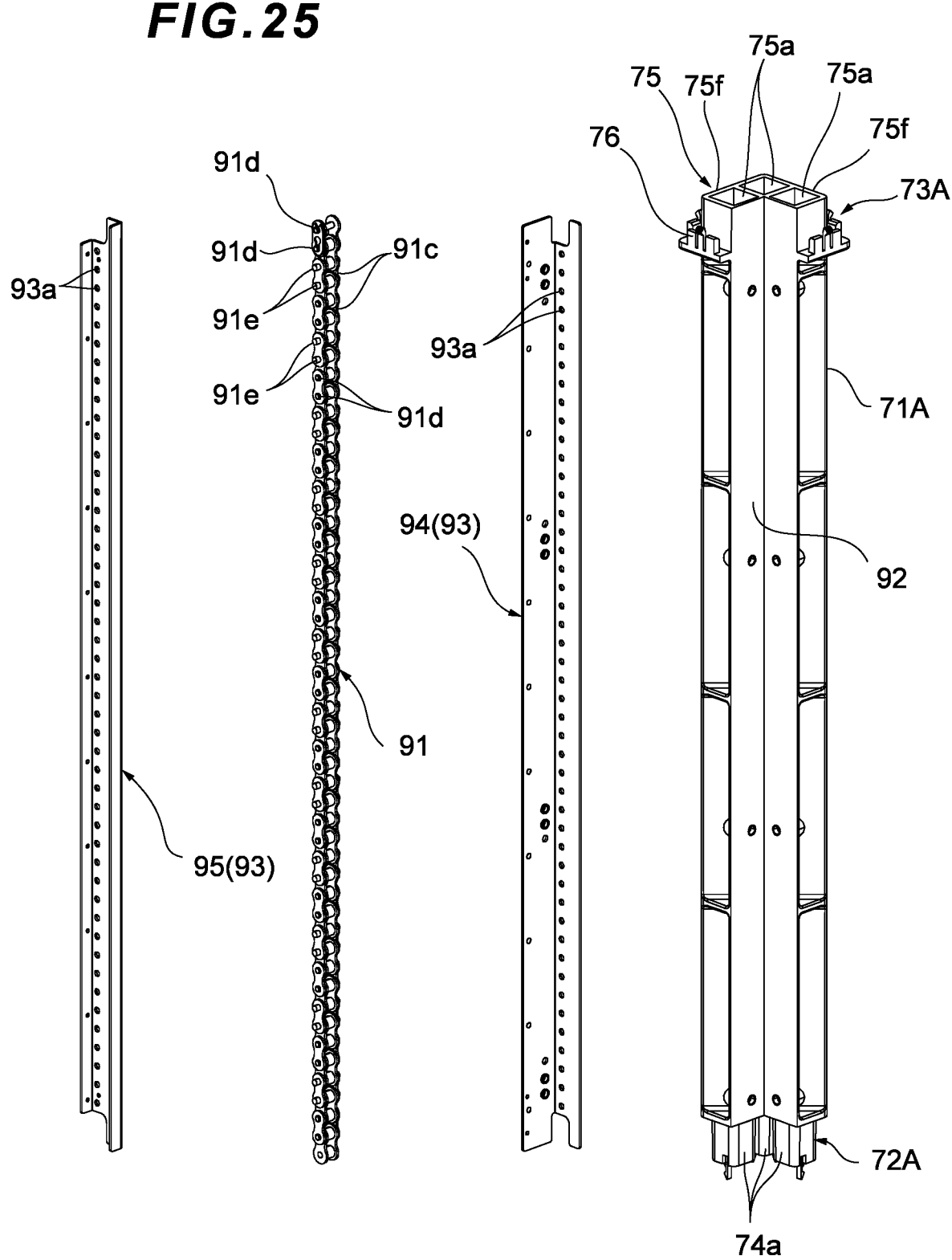
FIG. 25 is an exploded perspective view of the support column module illustrated in FIG. 23.
Figure 27:
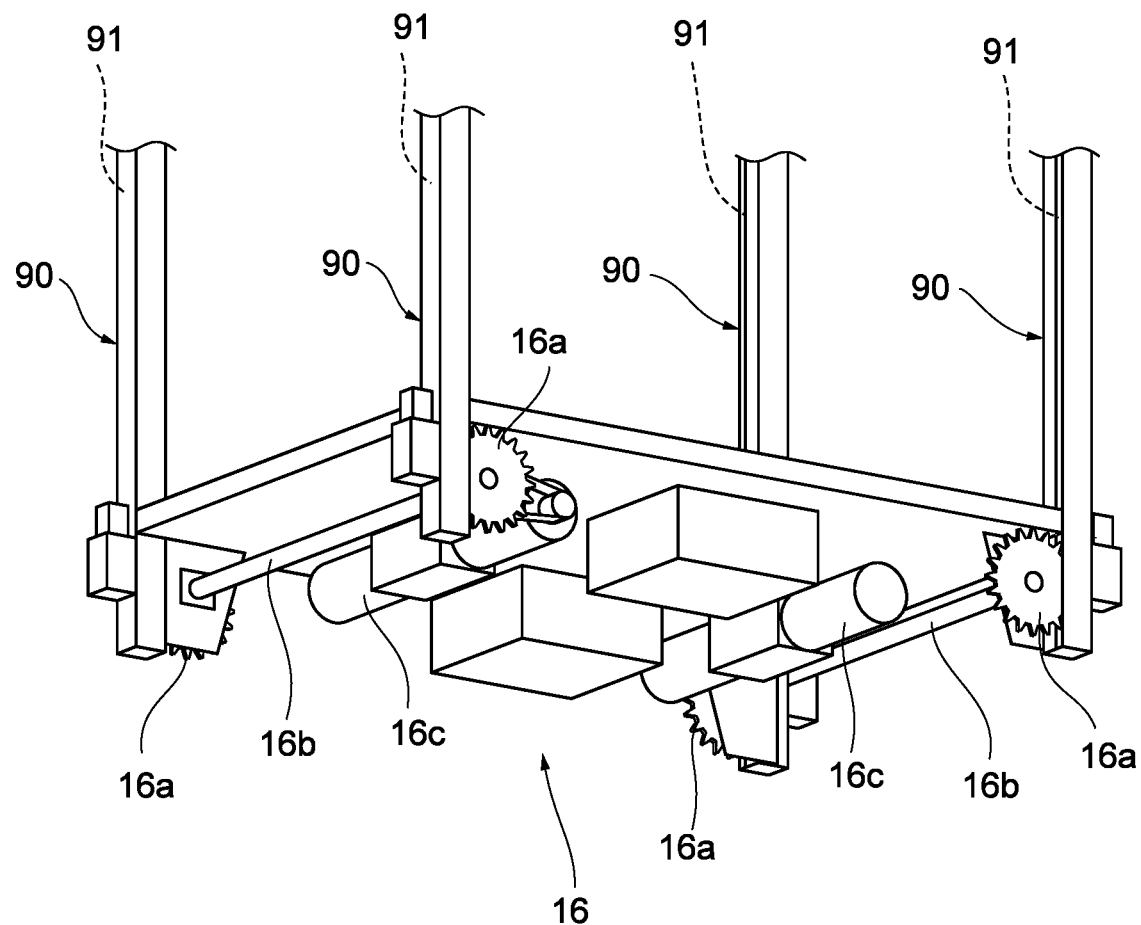
FIG. 27 is a perspective view of a transportation elevator and a part of a passage of the transportation elevator in the rack.

Next, a support column module 90 for forming a passage for movement of the above-described transportation elevator 16 will be described. FIG. 22 is a side view of the support column module 90, FIGS. 23 and 24 are perspective views of the support column modules 90, and FIG. 25 is an exploded perspective view of the support column module 90. Furthermore, FIG. 27 is a perspective view of the transportation elevator 16 and part of a passage of the transportation elevator 16 in the rack 10. The automated storage and retrieval system 1 or the rack 10 may include the support column modules 90. Each of the support column modules 90 extends between at least mutually neighboring floors 11, specifically at least between one floor 11 and another floor 11 located immediately above or beneath the one floor 11. One support column module 90 is configured to be able to be coupled to another support column module 90. The support column module 90 differs from the above-described support column module 70 in that a component for movement of the transportation elevator 16 is attached. Furthermore, to attach the component for movement of the transportation elevator 16, the support column module 90 includes a main body 71A different from the main body 71, an insertion plug 72A different from the insertion plug 72, and an accommodation plug 73A different from the accommodation plug 73. Hereinafter, the components of the support column module 90 which are the same as or have similar functions to those of the support column module 70 will be assigned the same reference numerals, description thereof will be omitted, and the different components will be described.

The component of the support column module 90 for movement of the transportation elevator 16 is, for example, an engagement member 91 which a driving member of the transportation elevator 16 engages with, and is more specifically, for example, a roller chain 91 which one of sprockets 16a (see FIG. 27) of the transportation elevator 16 engages with as illustrated in FIGS. 22 to 25. The roller chain 91 extends in parallel or substantially parallel to the axis a1 in the support column module 90. Furthermore, the roller chain 91 extends between the main body 71A and the accommodation plug 73A. Furthermore, the roller chain 91 is provided to the support column module 90 such that the roller chain 91 is located in a space which is the passage of the transportation elevator 16 in the rack 10. Note that the space which is the passage of the transportation elevator 16 is, for example, a space corresponding to the zone space S. Hence, the main body 71A, the insertion plug 72A, and the accommodation plug 73A do not have a part overlapping the space which is the passage of the transportation elevator 16. As illustrated in, for example, FIG. 25, the main body 71A, the insertion plug 72A, and the accommodation plug 73A form a space 92 extending along the axis a1.

More specifically, as illustrated in, for example, FIG. 25, the main body 71A has no part corresponding to the main body 71 located in the one zone space S compared to the main body 71 of the support column module 70, and does not include, for example, the ¼ part of the main body 71 around the axis a1 corresponding to one of the dotted lines P1 to P4 (see FIG. 13G). Furthermore, as illustrated in, for example, FIG. 25, the insertion plug 72A has no part corresponding to the insertion plug 72 located in the one zone space S compared to the insertion plug 72, and does not include, for example, the ¼ part of the insertion plug 72 around the axis a1 corresponding to one of the dotted lines P1 to P4 (see FIG. 13G). Furthermore, as illustrated in, for example, FIG. 25, the accommodation plug 73A has no part corresponding to the accommodation plug 73 located in the one zone space S compared to the accommodation plug 73, and does not include, for example, the ¼ part of the accommodation plug 73 around the axis a1 corresponding to one of the dotted lines P1 to P4 (see FIG. 13G). Thus, the support column module 90 has the space 92 formed at, for example, parts of the main body 71A, the insertion plug 72A, and the accommodation plug 73A located in the space which is the passage of the transportation elevator 16. The space 92 corresponds to, for example, a projection space in the axis a1 direction at one of the corner portions 83a to 83d of the floor module 80.

As illustrated in, for example, FIGS. 22 to 25, the roller chain 91 is a chain with ends including a pair of end parts 91a and 91b, and extends in the space 92 in the axis a1 direction. The one end part 91a of the roller chain 91 is located at a position of the accommodation plug 73A in the axis a1 direction in the space 92, and the one end part 91b of the roller chain 91 is located at a position of the insertion plug 72A in the axis a1 direction in the space 92. Furthermore, the roller chain 91 is fixed to a fixing member 93 provided in the space 92 and forming a space which can accommodate the roller chain 91. As illustrated in, for example, FIGS. 22 to 25, the fixing member 93 is a member whose cross-sectional shape perpendicular to the axis a1 is a substantially U shape, and includes a fixing member piece 94 which is a member whose cross-sectional shape perpendicular to the axis a1 is a substantially L shape, and a fixing member piece 95 which is a member fixed to this fixing member piece 94. The fixing member piece 94 is fixed to, for example, a part of the main body 71A defining the space 92, and extends from the position of the insertion plug 72a to the position of the accommodation plug 73A in the axis a1 direction in the space 92 as illustrated in FIGS. 22 to 25. Furthermore, the fixing member piece 95 is fixed to the fixing member piece 94 facing the fixing member piece 94 in the direction perpendicular to the axis a1 with a gap extending in the axis a1 direction interposed therebetween.

As illustrated in FIGS. 22 to 25, the roller chain 91 includes pins 91d for coupling each chain piece 91c. Part of the pins 91d is/are a pin/pins 91e whose both ends each protrude from the chain piece 91c. Although the pin 91d and the pin 91e are alternately provided with a fixed interval interposed therebetween in the illustrated examples, and arrangement of the pins 91d and 91e is not limited to this. Furthermore, all pins of the roller chain 91 may be the pins 91e. Note that reference numerals are not assigned to all of the pins 91d and 91e, and are omitted in FIG. 25.

Furthermore, as illustrated in FIG. 25, recess parts 93a which can accommodate distal ends of the pins 91d are formed in the fixing member pieces 94 and 95 so as to meet the pins 91d of the roller chain 91. When the pins 91d are accommodated in the recess parts 93a, the roller chain 91 is fixed to the fixing member 93 (fixing member pieces 94 and 95). Note that the components for fixing the roller chain 91 to the fixing member 93 are not limited to these pins 91d and recess parts 93a. Components or a method for fixing the roller chain 91 to the fixing member 93 may be other components or methods such as screwing or welding. Note that, similar to the pins 91d and 91e, reference numerals are not assigned to all of the recess parts 93a, and are omitted in FIG. 25.

Figure 26:
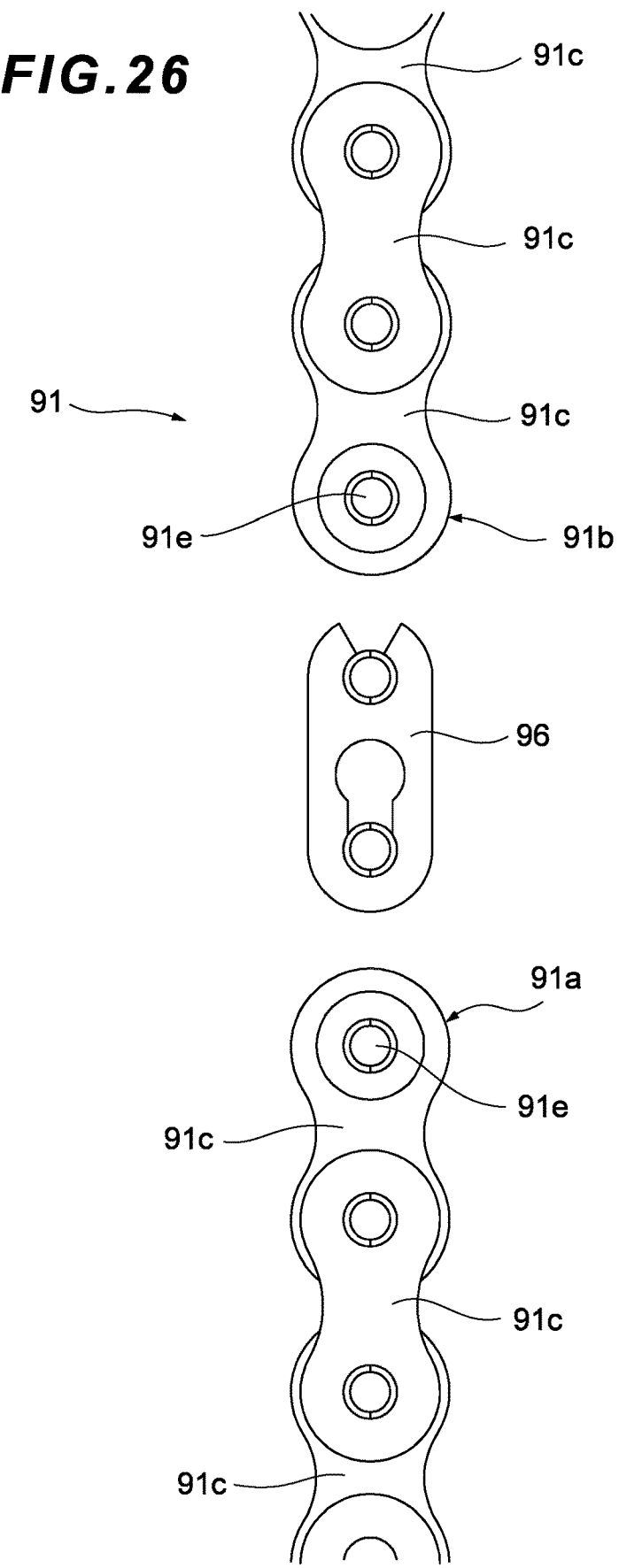
FIG. 26 is a view for illustrating a configuration for coupling roller chains of the support column module illustrated in FIG. 23.

Furthermore, as illustrated in FIG. 26, the roller chain 91 includes clips 96 for coupling to the roller chain 91 of the other support column module 90 to which this support column module 90 is coupled. The clip 96 is a member for coupling the chain piece 91c of the end part 91a of the one roller chain 91 and the chain piece 91c of the end part 91b of the other roller chain 91, and can engage with the respective pins 91e of the two chain pieces 91c to be coupled. Note that components or a method for coupling the two roller chains 91 are not limited to these clips 96, and may be other components or methods.

The plurality of support column modules 90 is coupled in the rack 10 similar to the support column modules 70 to form shafts of the transportation elevator 16 extending in the z axis direction. Furthermore, as illustrated in FIG. 27, the four shafts of this transportation elevator 16 are arranged facing each other such that the roller chains 91 extending along the respective shafts face each other so as to form a movement space of the transportation elevator 16, so that a movement rail and the movement space of the transportation elevator 16 are formed. As described above, the respective roller chains 91 of the plurality of support column modules 90 are coupled by coupling the end part 91a or the end part 91b of the one roller chain 91 and the end part 91b or the end part 91a of the other roller chain 91 by using the clip 96. Thus, in the shafts of the transportation elevator 16 formed by coupling the plurality of support column modules 90, the plurality of roller chains 91 becomes a string of a roller chain.

As illustrated in FIG. 27, in the movement space of the transportation elevator 16, the four respective sprockets 16a of the transportation elevator 16 mesh with the roller chains 91 of the four shafts. By driving two electric motors 16c of the transportation elevator 16, each sprocket 16a is rotated via a shaft 16b, each sprocket 16a moves on the roller chain 91, and thereby the transportation elevator 16 moves along the shaft in the z axis direction.

As described above, the rack 10 includes the support column modules 90 forming the movement rails of the transportation elevators 16, and makes it possible to form the movement rails and the movement spaces of the transportation elevators 16 by combining the support column modules 90. Furthermore, the support column module 90 has the same or substantially same length (the length in the axis a1 direction) as that of the support column module 70. Furthermore, the support column module 90 has part of the floor reception part 76 outside the movement space of the transportation elevator 16, and can support the floor module 80 outside the movement space of the transportation elevator 16 similar to the support column module 70. Consequently, by changing to the support column modules 90 the support column modules 70 facing a single zone space S in the rack modules 2 surrounding the one zone space S in an xy axis plane direction, it is possible to form the movement space of the transportation elevator 16 in this one zone space S.

As described above, the four support column modules 90 facing each other form the movement space of the transportation elevator 16 corresponding to the one zone space S, so that the support column modules 90 can make a component unit of the movement space of the transportation elevator 16 smaller. By combining the support column modules 90 with the rack modules 2, it is possible to easily form the movement spaces of the transportation elevators 16 in the rack 10. Furthermore, the support column modules 90 can form the movement space of the transportation elevator 16 only in the one zone space S. Consequently, it is possible to form the complicated movement spaces of the transportation elevators 16 in the rack 10. Furthermore, it is possible to form the movement spaces of the transportation elevators 16 inside the rack 10, too. Consequently, it is possible to flexibly design the form of the automated storage and retrieval system 1.

Note that, although the above-described support column modules 90 have the roller chains 91 as the engagement members engaging with the sprockets 16a of the transportation elevator 16, the engagement members included in the support column modules 90 are not limited to the roller chains, may be members which the sprockets 16a can engage with, and may be a rack of a rack and pinion. Furthermore, the support column module 90 may not include the fixing member 93, and the roller chain 91 may be fixed to the main body 71A, the insertion plug 72A, and the accommodation plug 73A. Furthermore, the support column module 90 may include the hooks 79 instead of the floor reception part 76 similar to the support column module 70V. Furthermore, the support column module 90 may extend over heights of a plurality of floors, or may extend shorter than the height of one floor. Furthermore, the roller chain 91 may extend longer than the support column module 90 (the main body 71A, the insertion plug 72A, and the accommodation plug 73A), or may be shared between the plurality of support column modules 90. Furthermore, the support column modules 90 may form a passage of the transportation elevator 16 outside the rack in the automated storage and retrieval system 1.

This description discloses some embodiments of the subject matter of the present disclosure, and uses examples to enable the one of ordinary skilled in the art to carry out the embodiments of the subject matter of the present disclosure including manufacturing and using an arbitrary device and system and executing an arbitrary incorporated method. The patentable scope of the subject matter of the present disclosure is defined by the claims, and may include other examples achieved by the one of ordinary skilled in the art. These other examples intend to be within the claims in a case where the other examples include components which are not different from wordings of the claims, or in a case where the other examples include equivalent components including non-substantial differences from the wordings of the claims.

The invention claimed is:

1. An automated storage and retrieval system comprising:
a rack storing a plurality of bins for containing items;
a transportation robot for transporting the bin in the rack; and
a transportation elevator which moves in the rack and can transport the transportation robot, wherein
the rack includes a plurality of floors each of which stores each of the plurality of bins, and allows the transportation robot to run along a surface thereof, and the rack includes a plurality of support column modules forming a passage of the transportation elevator, and
each of the support column modules extends between at least mutually neighboring floors, and one support column module is configured to be able to be coupled to another support column module each of the support column modules includes an engagement member guiding the transportation elevator, wherein the engagement member of the one support column module is configured to be able to be coupled to the engagement member of the other support column module.

2. The automated storage and retrieval system according to claim 1, wherein the transportation elevator includes at least one driven part to be rotationally driven, and
the engagement member is configured to be engaged with the driven part of the transportation elevator.

3. The automated storage and retrieval system according to claim 2, wherein
the driven part of the transportation elevator is a sprocket, and
the engagement member is a roller chain.

4. The automated storage and retrieval system according to claim 1, wherein each of the support column modules is configured to be able to support the floor adjacent to the passage of the transportation elevator.

5. The automated storage and retrieval system according to claim 4, wherein the engagement member of each of the support column modules is configured to be located in a space of the passage of the transportation elevator, and each of the support column modules is configured to be able to support the floor outside the space of the passage of the transportation elevator.

6. The automated storage and retrieval system according to claim 1, wherein each of the support column modules includes
an insertion plug, an accommodation plug, and a main body extending between the insertion plug and the accommodation plug, and
the insertion plug and the accommodation plug are configured to be able to be coupled to each other.

7. The automated storage and retrieval system according to claim 6, wherein the main body includes a base part and a plurality of rib parts.

8. The automated storage and retrieval system according to claim 6, wherein the insertion plug and the accommodation plug of the support column module are positioned in opposite ends of the main body and along axis a1 defined along a length of the main body.

9. The automated storage and retrieval system according to claim 6, wherein two support columns being coupled to each other by connecting the insertion plug of one support column to the accommodation plug of the other support column.

10. The automated storage and retrieval system according to claim 6, wherein the insertion plug being defined with a plurality of insertion parts including a plurality of insertion protrusion parts protruding in direction of the axis a1.

11. The automated storage and retrieval system according to claim 10, wherein the insertion protrusion parts being defined with claw parts extending along the axis a1 formed at a distal end of each insertion protrusion parts.

12. The automated storage and retrieval system according to claim 6, wherein the accommodation plug of a column module includes an accommodation part defined with a plurality of accommodation recess parts configured to accommodate the insertion protrusion parts of the insertion plug of another column module.

13. The automated storage and retrieval system according to claim 6, wherein the rack includes a floor module including a plurality of corner portions, the corner portions of the floor module configured to be supported by the accommodation plugs of the support column modules.

14. The automated storage and retrieval system according to claim 13, wherein the accommodation plug comprising:
a floor reception part formed around the accommodation part, wherein the floor reception part comprising:
a flange part forming a face extending along a plane perpendicular to the axis a1;
engagement protrusion parts protruding from the flange part to a side opposite to the main body in the axial direction, wherein the engagement protrusion part being defined with a plurality of claw part and a plurality of pins configured to engage with corresponding parts.

15. The automated storage and retrieval system according to claim 13, wherein the corner portions of the floor module are defined with cutout faces, each cutout face being defined with an engagement recess part and recess parts configured to accommodate the claw part and the pins of the engagement protrusion part.

16. The automated storage and retrieval system according to claim 8, wherein the support column module comprising hooks fixed to the accommodation part and configured to engage with the floor module.

17. The automated storage and retrieval system according to claim 1, wherein the transportation robot being configured to run on a movement passage defined in each floor of the rack.

18. The automated storage and retrieval system according to claim 1, wherein each of the storage bins face the movement passage defined in each floor of the rack.

19. The automated storage and retrieval system according to claim 1, wherein the transportation robot is configured to trace a line drawn on the floor of the rack.

20. The automated storage and retrieval system according to claim 1, wherein each floor of the rack includes one or more charging spots for charging a battery of the transportation robot.

* * * * *